(12) United States Patent
Yamaguchi et al.

(10) Patent No.: US 12,394,810 B2
(45) Date of Patent: *Aug. 19, 2025

(54) FUEL CELL SHIP

(71) Applicant: Yanmar Holdings Co., Ltd., Osaka (JP)

(72) Inventors: Yasuyoshi Yamaguchi, Osaka (JP); Takehiro Maruyama, Osaka (JP); Takuya Hiraiwa, Osaka (JP); Manabu Shinagawa, Osaka (JP); Yukihiko Kimura, Kunisaki (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 491 days.

This patent is subject to a terminal disclaimer.

(21) Appl. No.: 17/830,044

(22) Filed: Jun. 1, 2022

(65) Prior Publication Data
US 2022/0393208 A1 Dec. 8, 2022

(30) Foreign Application Priority Data
Jun. 2, 2021 (JP) .................... 2021-092702

(51) Int. Cl.
*H01M 8/04858* (2016.01)
*B60L 58/13* (2019.01)
(Continued)

(52) U.S. Cl.
CPC ......... *H01M 8/04947* (2013.01); *B60L 58/13* (2019.02); *B63H 21/17* (2013.01);
(Continued)

(58) Field of Classification Search
CPC .. B63H 21/17; B63H 2021/003; B63B 21/21; B63B 17/0027; B63B 11/02;
(Continued)

(56) References Cited

U.S. PATENT DOCUMENTS

| | | | | |
|---|---|---|---|---|
| 8,123,577 | B2 * | 2/2012 | Riggs .................... | H01M 12/06 440/6 |
| 8,683,937 | B2 * | 4/2014 | Sancoff .................... | B63G 8/36 114/61.15 |

(Continued)

FOREIGN PATENT DOCUMENTS

| | | |
|---|---|---|
| EP | 2908372 B1 | 2/2018 |
| JP | H07-050172 A | 2/1995 |

(Continued)

OTHER PUBLICATIONS

European Search Report issued dated May 30, 2023 issued in EP Application No. 22175790.9.

(Continued)

*Primary Examiner* — Daniel V Venne
(74) *Attorney, Agent, or Firm* — NORTON ROSE FULBRIGHT US LLP

(57) ABSTRACT

A fuel cell ship includes a propulsion device that generates propulsive force on a hull by electric power, an electric power supply unit that supplies the electric power to the propulsion device, and a degradation rate control unit that adjusts a degradation rate. The electric power supply unit includes a plurality of fuel cells that generate electric power by an electrochemical reaction of fuel and at least one storage battery.

11 Claims, 9 Drawing Sheets

(51) Int. Cl.
   *B63H 21/00*    (2006.01)
   *B63H 21/17*    (2006.01)
   *H01M 8/04664*  (2016.01)
   *H01M 8/04746*  (2016.01)

(52) U.S. Cl.
   CPC ... *H01M 8/04679* (2013.01); *H01M 8/04753* (2013.01); *H01M 8/04865* (2013.01); *B60L 2240/54* (2013.01); *B63H 2021/003* (2013.01); *H01M 2250/20* (2013.01)

(58) Field of Classification Search
   CPC ......... B63B 11/04; B63B 79/10; B60L 58/13; B60L 2240/54; B63J 2/02; H01M 8/04947; H01M 8/04679; H01M 8/04753; H01M 8/04865; H01M 2250/20; H01M 8/249; H01M 8/0444; H01M 16/006; H01M 8/04932; H01M 8/04089; H01M 8/04201; H01M 8/04664; H01M 8/04955; Y02E 60/50; Y02T 90/40; Y02T 70/50
   USPC ............................................ 440/1; 180/65.22
   See application file for complete search history.

(56) References Cited

U.S. PATENT DOCUMENTS

| | | | |
|---|---|---|---|
| 10,364,009 B2* | 7/2019 | Sako | H01M 8/04089 |
| 2006/0009092 A1* | 1/2006 | Krietzman | B63H 21/17 |
| | | | 440/6 |
| 2006/0012248 A1 | 1/2006 | Matsushita et al. | |
| 2007/0122667 A1* | 5/2007 | Kelley | C01B 3/382 |
| | | | 429/513 |
| 2010/0041285 A1 | 2/2010 | Riggs | |

FOREIGN PATENT DOCUMENTS

| | | |
|---|---|---|
| JP | 2015196411 A | 11/2015 |
| JP | 2017-174565 A | 9/2017 |
| JP | 2018-014291 A | 1/2018 |
| JP | 2018-092815 A | 6/2018 |
| JP | 2019-149267 A | 9/2019 |

OTHER PUBLICATIONS

Japanese Office Action dated Dec. 10, 2024 issued in JP Application No. 2021-092702.

* cited by examiner

FUEL CELL SHIP

CROSS-REFERENCE TO RELATED APPLICATIONS

This application is claims priority under 35 U.S.C. § 119 to JP Application No. 2021-092702 filed Jun. 2, 2021, the entire contents of which are hereby incorporated by reference.

TECHNICAL FIELD

The present invention relates to a fuel cell ship.

BACKGROUND ART

In the related art, a fuel cell ship in which a fuel gas (for example, hydrogen gas) is supplied from a fuel tank to a fuel cell and a propulsion device is driven by electric power generated by the fuel cell has been proposed (see, for example, Patent Document 1).

PRIOR ART DOCUMENT

Patent Document

Patent Document 1: Japanese Unexamined Patent Application Publication No. 2018-92815

SUMMARY OF INVENTION

Technical Problem

In the configuration of Patent Document 1, the fuel cell ship is equipped with one fuel cell, and thus if the fuel cell fails while the fuel cell ship is sailing, or if the fuel cell reaches the end of its equipment life, there is a risk that the fuel cell ship will not be able to continue sailing and will stop at sea.

The present invention has been made to solve the above-mentioned problems, with an object of the present invention being to provide a fuel cell ship capable of avoiding a situation in which the fuel cell ship stops at sea when a fuel cell fails during sailing or when a fuel cell reaches the end of its equipment life during sailing.

Solution to Problem

The fuel cell ship according to one aspect of the present invention includes a propulsion device that generates propulsive force on a hull by electric power, and an electric power supply unit that supplies the electric power to the propulsion device, and the electric power supply unit includes a plurality of fuel cells that generate electric power by an electrochemical reaction of fuel and at least one storage battery.

Advantageous Effects of Invention

With the configuration described above, it is possible to avoid situations in which a fuel cell ship stops at sea while sailing even if fuel cells fail, or equipment life of the fuel cells is reached while the fuel cell ship is sailing.

DESCRIPTION OF EMBODIMENTS

An embodiment of the present invention will be described below based on the drawings. In this description, direction is defined as follows. First, a direction from the stern to the bow of the fuel cell ship is "front", and a direction from the bow to the stern is "rear". A horizontal direction perpendicular to a front-rear direction is defined as a left-right direction. At this time, when the fuel cell ship is moving forward, the left side is defined as "left" and the right side is defined as "right" when viewed from the operator. The upstream side in the gravity direction perpendicular to the front-back direction and the left-right direction is referred to as "up", and the downstream side is referred to as "down".

[1. Schematic Configuration of Fuel Cell Ship]

Figure 1:
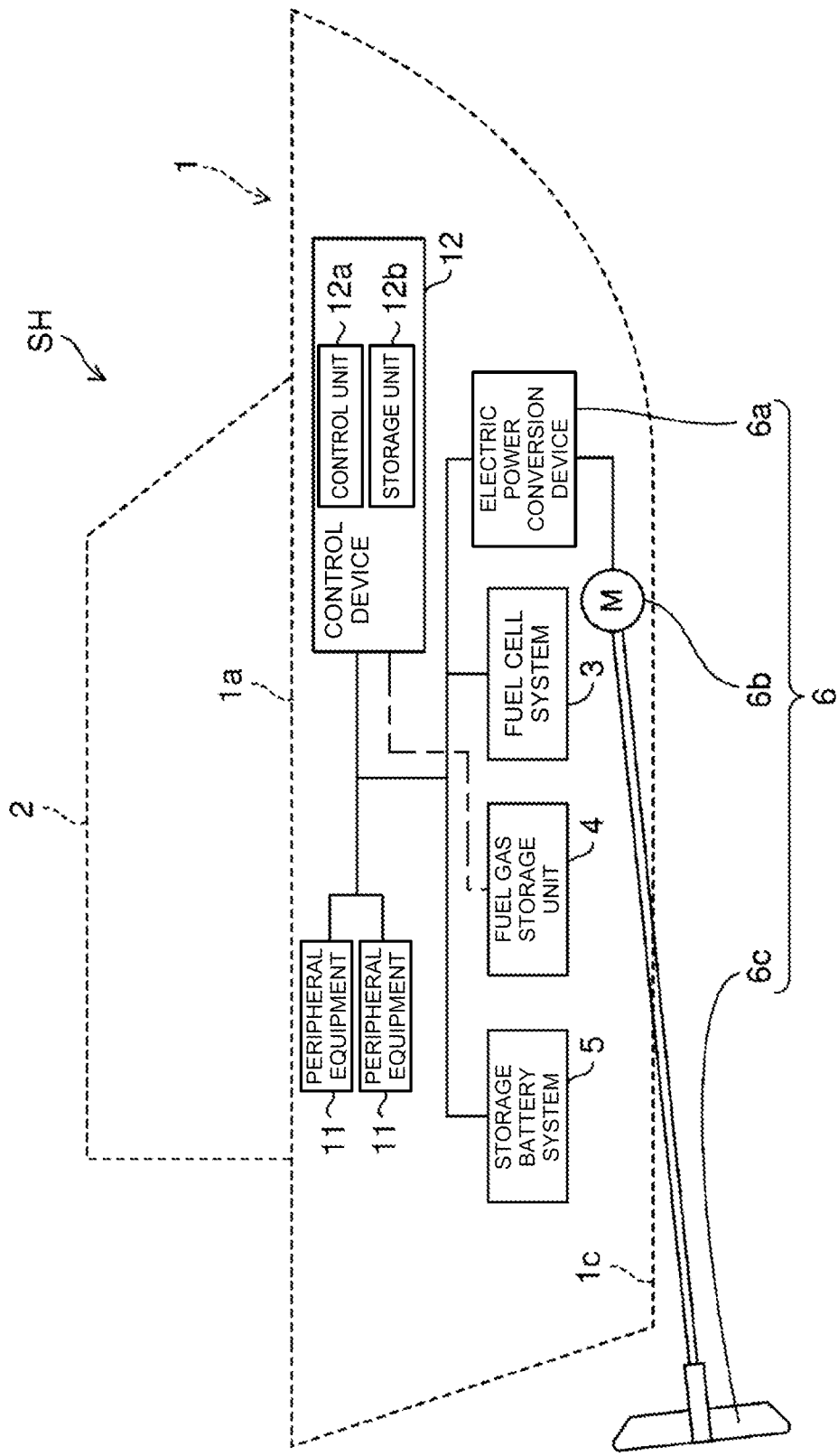
FIG. 1 is an explanatory diagram illustrating a schematic configuration of a fuel cell ship according to an embodiment of the present invention.

First, a configuration that will be a premise for a fuel cell ship SH according to the present embodiment will be described with reference to FIG. 1. FIG. 1 is an explanatory diagram illustrating a schematic configuration of the fuel cell ship SH. The fuel cell ship SH includes a hull 1 and a cabin 2. The cabin 2 is arranged on an upper surface of the hull 1.

The fuel cell ship SH further includes a fuel cell system 3, a fuel gas storage unit 4, a storage battery system 5, a propulsion device 6, a plurality of pieces of peripheral equipment 11, and a control device 12. In FIG. 1, a control signal or a high voltage power supply line is indicated by a solid line, and a control signal or a low voltage power supply line is indicated by a dashed line.

The fuel cell system 3 functions as a main power supply. The fuel cell system 3 consumes a fuel gas to generate electric power (specifically, DC electric power). The fuel gas is a combustible gas. Typically, the fuel gas is hydrogen gas. The fuel cell system 3 supplies generated electric power to the propulsion device 6 and the peripheral equipment 11. The fuel cell system 3 can also supply electric power to the storage battery system 5 to charge the storage battery system 5.

The fuel gas storage unit 4 is a fuel storage unit that stores the fuel gas to be supplied to the fuel cell system 3. The supply of the fuel gas from the fuel gas storage unit 4 to the fuel cell system 3 is performed via a fuel gas supply pipe 32 described later (see FIG. 11).

The storage battery system 5 functions as an auxiliary power source for supplying the stored electric power (specifically, DC electric power) to the propulsion device 6 and the peripheral equipment 11. By the storage battery system 5 functioning as an auxiliary power source, it is possible to compensate for a shortage of electric power supplied from the fuel cell system 3 to the propulsion device 6 or the like. The storage battery system 5 may convert the voltage into an appropriate voltage to supply electric power to the control device 12.

The propulsion device 6 is driven by electric power supplied from at least one of the fuel cell system 3 and the storage battery system 5, and generates a propulsive force on the hull 1. That is, the fuel cell ship SH includes the propulsion device 6 that generates propulsive force on the hull 1 by electric power.

The propulsion device 6 includes an electric power conversion device 6a, a propulsion motor 6b, and a propeller 6c. The electric power conversion device 6a converts the electric power supplied from the fuel cell system 3 into electric power according to the specifications of the propulsion motor 6b. For example, the electric power conversion device 6a converts DC electric power into AC electric power. In this case, the electric power conversion device 6a has, for example, an inverter. The propulsion motor 6b is driven by electric power (for example, AC electric power) supplied from the electric power conversion device 6a. When the propulsion motor 6b is driven, the rotational force of the propulsion motor 6b is transmitted to the propeller 6c. As a result, the propeller 6c rotates, and a propulsive force is generated on the hull 1. A configuration is also possible in which a marine gear is provided between the propulsion motor 6b and the propeller 6c.

Examples of the peripheral equipment 11 include a compressor, a solenoid valve, and a pump. Examples of the peripheral equipment 11 also include electrical equipment such as lighting equipment and air conditioning equipment, but the types of peripheral equipment 11 are not particularly limited.

The control device 12 controls the fuel cell system 3, the fuel gas storage unit 4, the storage battery system 5, the propulsion device 6, and the plurality of pieces of peripheral equipment 11. The control device 12 is composed of, for example, one or two or more computers. The computer is, for example, a Programmable Logic Controller (PLC), but may also be an Electronic Control Unit (ECU). The control device 12 is supplied with electric power from a battery (for example, a lead battery) (not illustrated) or the storage battery system 5, via a device that converts electric power into an appropriate voltage.

The control device 12 has a control unit 12a and a storage unit 12b. The control unit 12a includes a processor such as a Central Processing Unit (CPU). The storage unit 12b includes a storage device and stores data and computer programs. Specifically, the storage unit 12b includes a main storage device such as a semiconductor memory and an auxiliary storage device such as a semiconductor memory, a solid state drive, and/or a hard disk drive. The storage unit 12b may also include removable media. The storage unit 12b corresponds to an example of a non-transitory computer-readable storage medium.

The processor of the control unit 12a executes a computer program stored in the storage device of the storage unit 12b, to control the fuel cell system 3, the fuel gas storage unit 4, the storage battery system 5, the propulsion device 6, and the plurality of pieces of peripheral equipment 11.

[2. Configuration of Main Units of Fuel Cell Ship]

Figure 2:
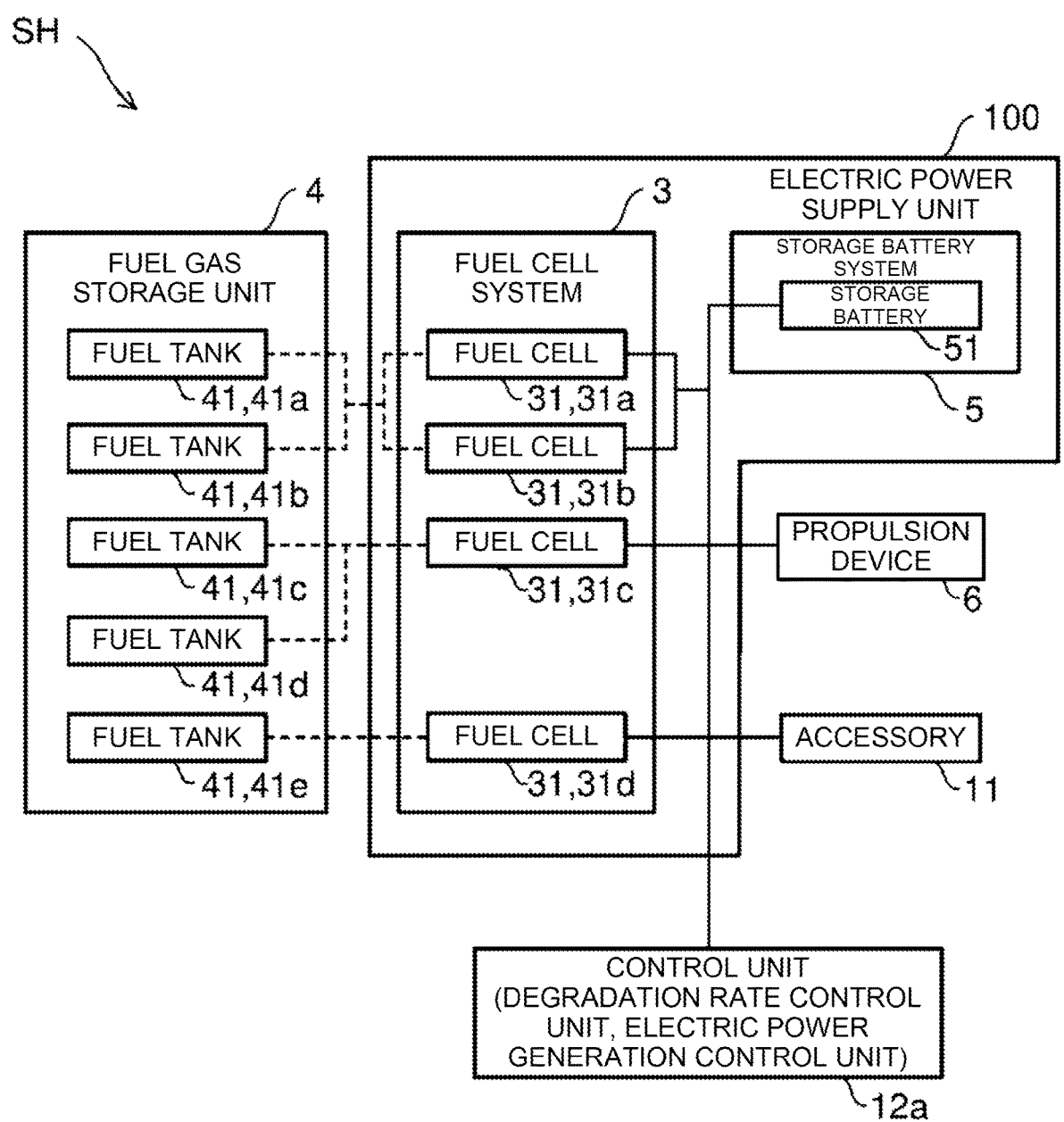
FIG. 2 is a block diagram schematically illustrating a configuration of main units of the fuel cell ship.

FIG. 2 is a block diagram schematically illustrating the configuration of the main units of the fuel cell ship SH of the present embodiment. In FIG. 2, the dashed line path indicates the fuel gas supply path, and the solid line path indicates the electric power supply path or the supply path of control signals output by the control unit 12a. The fuel cell ship SH includes an electric power supply unit 100. The electric power supply unit 100 supplies electric power to the propulsion device 6 described above.

The electric power supply unit 100 includes the fuel cell system 3. The fuel cell system 3 includes a plurality of fuel cells 31. The fuel cell 31 generates electric power (specifically, DC electric power) by an electrochemical reaction between the fuel gas and an oxidant gas. The fuel gas is an example of fuel supplied to the fuel cell 31 from a fuel tank 41 (described later) in the fuel gas storage unit 4. The oxidant gas is air and the oxidant is oxygen. That is, the electric power supply unit 100 has the plurality of fuel cells 31 that generate electric power by the electrochemical reaction of fuel.

The fuel cell 31 is a fuel cell stack composed of a plurality of stacked cells. For example, each cell of the fuel cell 31 has a solid polymer electrolyte membrane, an anode electrode, a cathode electrode, and a pair of separators. The solid polymer electrolyte membrane is sandwiched between the anode electrode and the cathode electrode. The anode electrode is a negative electrode (fuel electrode). The anode electrode includes an anode catalyst layer and a gas diffusion layer. The cathode electrode is a positive electrode (air electrode). The cathode electrode includes a cathode catalyst layer and a gas diffusion layer. The anode electrode, the solid polymer electrolyte membrane, and the cathode electrode form a Membrane-Electrode Assembly (MEA). The pair of separators sandwich the membrane-electrode assembly. Each separator has a plurality of grooves. Each groove of one separator forms a flow path for the fuel gas. Each groove of the other separator forms a flow path for the oxidant gas.

In the configuration described above of the fuel cell 31, hydrogen included in the fuel gas is decomposed into hydrogen ions and electrons by the catalyst on the anode electrode side. Hydrogen ions pass through the solid polymer electrolyte membrane and move to the cathode electrode side. On the other hand, the electrons move to the cathode electrode side through an external circuit. As a result, an electric current is generated (electricity is generated). On the cathode electrode side, oxygen included in the oxidant gas combines with the electrons that flow through the external circuit and hydrogen ions that pass through the solid polymer electrolyte membrane to generate water. The generated water is discharged outside the ship via a discharge pipe 31a (see FIG. 11).

The fuel cell 31 supplies generated electric power to the propulsion device 6 and the peripheral equipment 11. The fuel cell 31 may indirectly supply generated electric power to the propulsion device 6 and the peripheral equipment 11 via a circuit such as a DC/DC converter or the like.

The electric power supply unit 100 further includes the storage battery system 5. The storage battery system 5 includes a storage battery 51 that stores electric power. The storage battery 51 is, for example, a lithium secondary battery, but may also be a nickel-cadmium storage battery, a nickel-hydrogen storage battery, or the like. The number of storage batteries 51 is not particularly limited, and may be one or more. That is, the electric power supply unit 100 has at least one storage battery 51.

The capacity of the storage battery 51 can be appropriately set. If there are a plurality of storage batteries 51, the storage batteries 51 may be connected in series or in parallel. The storage battery 51 supplies stored electric power to the propulsion device 6 and the peripheral equipment 11.

As described above, by the electric power supply unit 100 having the plurality of fuel cells 31 and at least one storage battery 51, even if one of the plurality of fuel cells 31 fails for some reason or has reached the end of its equipment life while the fuel cell ship SH is sailing, it is possible to continue generating electricity by the remaining fuel cells 31, and the electric power generated by the remaining fuel cells 31 can be supplied to the propulsion device 6 to operate the propulsion device 6. Even if electric power generation is stopped in all the fuel cells 31 for some reason or due to reaching the equipment life, electric power stored in at least one storage battery 51 can be supplied to the propulsion device 6 to operate the propulsion device 6. That is, even if at least one of the fuel cells 31 fails, or even if the equipment life is reached while the fuel cell ship SH is sailing, it is possible to avoid a situation in which the fuel cell ship SH stops at sea while sailing.

The fuel gas storage unit 4 of the fuel cell ship SH has the fuel tank 41. The fuel tank 41 stores the fuel gas as fuel to be supplied to the fuel cells 31. In the present embodiment, a plurality of the fuel tanks 41 are provided. That is, the fuel cell ship SH includes the plurality of fuel tanks 41 for storing fuel. Each of the plurality of fuel cells 31 described above is connected to at least one of the fuel tanks 41 via the fuel gas supply pipe 32 (see FIG. 11). The fuel gas is supplied to each fuel cell 31 from the at least one of the fuel tanks 41.

Here, as illustrated in FIG. 2, it is presumed that, for example, five fuel tanks 41 are provided in the fuel cell ship SH. For convenience of explanation, each fuel tank 41 is also referred to as an individual tank 41a to 41e. That is, the plurality of fuel tanks 41 include a plurality of individual tanks 41a to 41e for storing the fuel gas.

In the present embodiment, the plurality of fuel tanks 41 particularly include the individual tanks 41a and 41b. The individual tanks 41a and 41b are connected to the same two or more fuel cells 31 of the plurality of fuel cells 31 (for example, fuel cells 31a and 31b in FIG. 2).

In this configuration, even if any one of the plurality of fuel cells 31 (for example, fuel cell 31a) fails for some reason or has reached the end of its equipment life while the fuel cell ship SH is sailing, it is possible to supply the fuel gas from the individual tanks 41a and 41b to the remaining fuel cells 31 (for example, fuel cell 31b) to continue electric power generation, and the fuel cell ship SH can continue sailing. Therefore, in this case, the fuel gas stored in each of the individual tanks 41a and 41b can be effectively used (can be used up for driving the other fuel cell 31b).

Of the plurality of fuel tanks 41, individual tanks 41c and 41d are each connected to the same fuel cell 31c and supply the fuel gas to the same fuel cell 31c. The individual tank 41e is connected to one fuel cell 31d and supplies the fuel gas to only the one fuel cell 31d.

Figure 3:
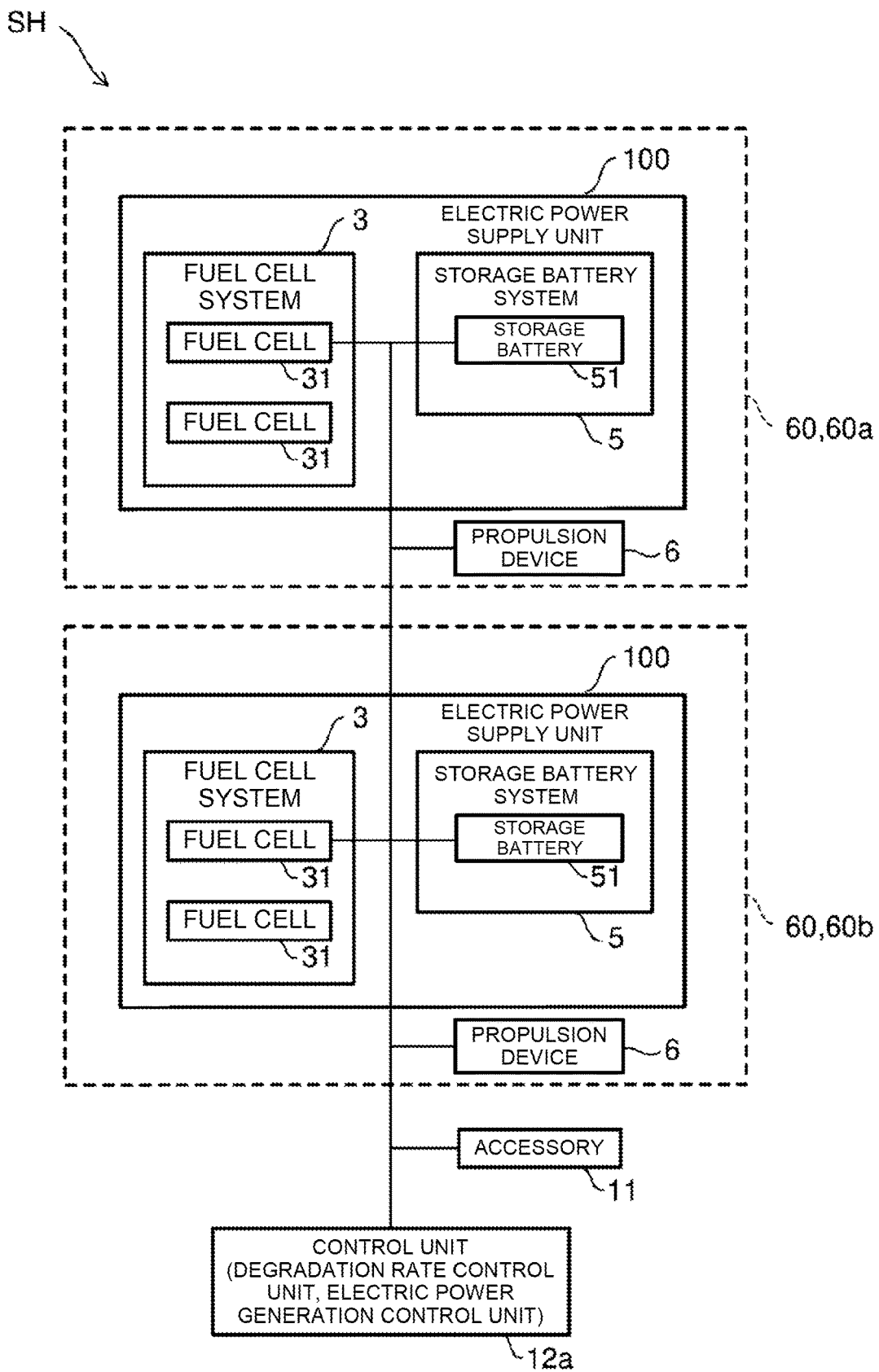
FIG. 3 is a block diagram schematically illustrating another configuration of the fuel cell ship.

FIG. 3 is a block diagram schematically illustrating another configuration of the fuel cell ship SH. In FIG. 3, for convenience, an illustration of the fuel gas storage unit 4 illustrated in FIG. 2 is omitted. When a set formed by the propulsion device 6 and the electric power supply unit 100 is referred to as a propulsion power device 60, the fuel cell ship SH may have two propulsion power devices 60, as illustrated in FIG. 3, or may have three or more propulsion power devices 60 (not illustrated). That is, the fuel cell ship SH may have a plurality of sets of the propulsion device 6 and the electric power supply unit 100. When it is necessary to particularly distinguish each propulsion power device 60, each propulsion power device 60 is referred to as a propulsion power device 60a and a propulsion power device 60b. The configuration of the electric power supply unit 100 in the propulsion power device 60a and the propulsion power device 60b is the same as that in FIG. 2.

In this configuration, even if the fuel cell 31 or the propulsion device 6 fails for some reason in any of the sets (for example, the propulsion power device 60a) while the fuel cell ship SH is sailing, the fuel cell ship SH can continue sailing by operating another set (for example, the propulsion power device 60b). As a result, it is possible to avoid a situation in which the fuel cell ship SH stops while sailing.

[3. Operation Plan of Fuel Cell Ship]

Next, the operation plan of the fuel cell ship SH will be described. Here, as an example, it is presumed that the fuel cell ship SH is equipped with six fuel cells 31, and the fuel cells 31 mounted at the start of operation of the fuel cell ship SH are fuel cells A0, B0, C0, D0, E0 and F0.

Figure 4:
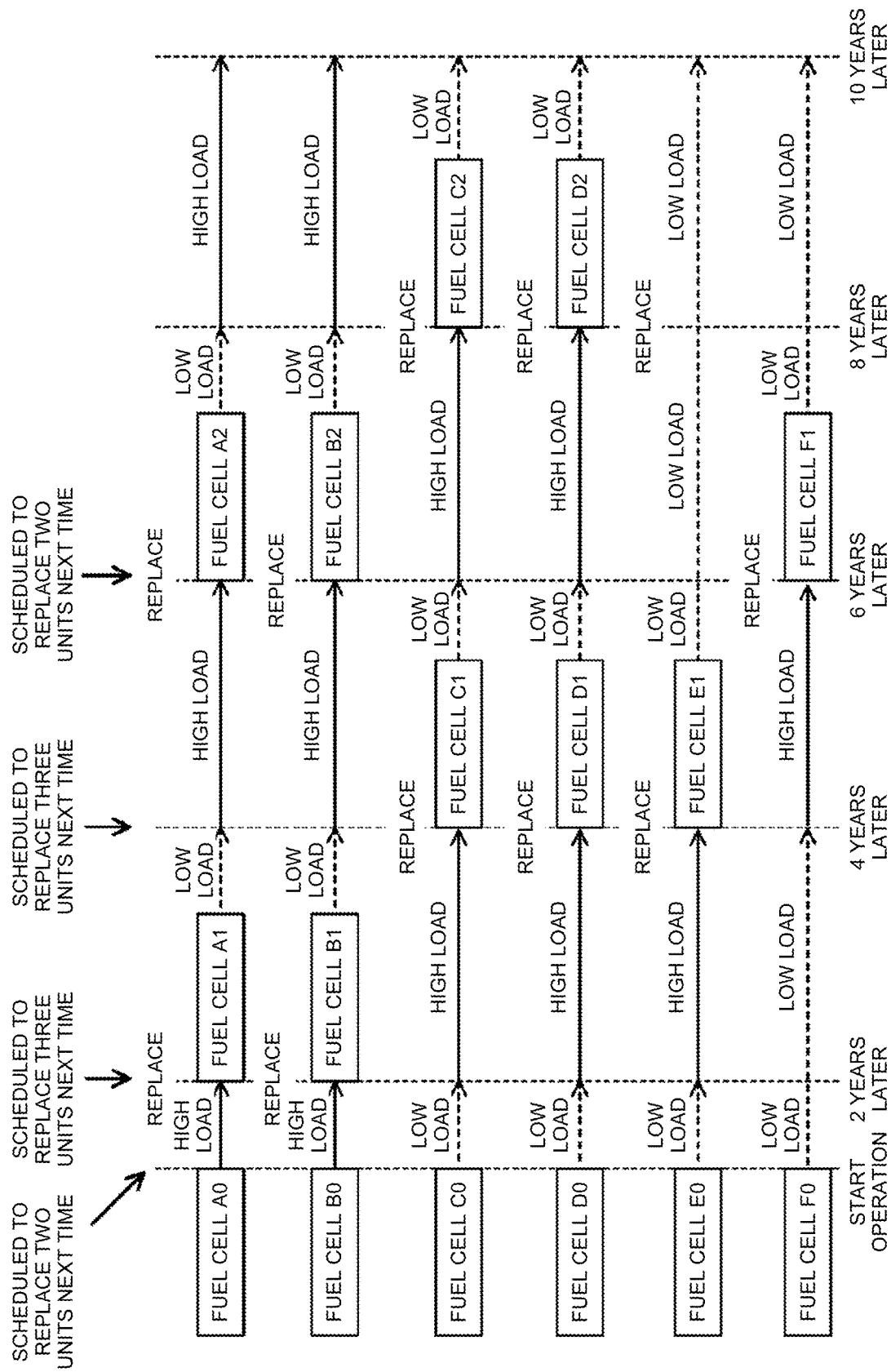
FIG. 4 is a time chart schematically illustrating a replacement plan for each fuel cell as an operation plan for the fuel cell ship.

FIG. 4 is a time chart schematically illustrating a replacement plan for each fuel cell 31 as an operation plan for the fuel cell ship SH. The replacement of each fuel cell 31 is typically performed if the fuel cell ship SH enters a dock for maintenance. Here, the period when a medium-sized ship or a large ship enters a dock is generally about once every one to three years. If docking is performed only for replacement of the fuel cell 31 when the fuel cell 31 reaches the end of its life during sailing, such docking will affect the operation plan of the ship and economic efficiency of the ship is significantly impaired. Therefore, it is desirable that the timing of replacement due to the life of the fuel cell 31 coincides with the timing of entering the dock (maintenance period) of the fuel cell ship SH based on a predetermined operation plan.

In the present embodiment, as illustrated in FIG. 4, by replacing two or three fuel cells 31 at the timing for entering the dock every two years planned in advance, all of the fuel cells are always maintained in an operable state. For example, the fuel cell A0 is replaced with the fuel cell A1 two years after the start of operation, and is further replaced with the fuel cell A2 four years later (six years after the start of operation). Similarly, the fuel cell B0 is replaced with the fuel cell B1 two years after the start of operation, and is further replaced with the fuel cell B2 four years later. The fuel cell C0 is replaced with the fuel cell C1 four years after the start of operation, and is further replaced with the fuel cell C2 four years later. Similarly, the fuel cell D0 is replaced with the fuel cell D1 four years after the start of operation, and is further replaced with the fuel cell D2 four years later. The fuel cell E0 is replaced with the fuel cell E1 four years after the start of operation. The fuel cell F0 is replaced with the fuel cell F1 six years after the start of operation.

In FIG. 4, "High load" indicates an operation that promotes degradation of the fuel cell 31, that is, an operation in which the degradation progress rate of the fuel cell 31 is relatively fast with respect to the operating time (high load operation). On the other hand, "Low load" indicates an operation in which degradation of the fuel cell 31 is suppressed, that is, an operation in which the degradation progress rate of the fuel cell 31 is relatively slow with respect to the operating time (low load operation). The degradation of the fuel cell 31 refers to, for example, the degradation of the catalyst (for example, platinum) included in the electrodes (anode electrode, cathode electrode) of the fuel cell 31.

The operation pattern (high load operation/low load operation) of each fuel cell 31 is preset based on the specifications of the fuel cell 31 and the operation plan of the fuel cell ship SH. The setting of the operation pattern is updated according to the actual state of degradation of the fuel cell 31 checked each time maintenance is performed. The operation pattern of the fuel cell ship SH may be machine-learned, and the control unit 12a may automatically determine an optimum replacement plan from the actual degradation status of the fuel cell 31.

[4. Degradation Rate of Fuel Cell]

In the present embodiment, the degree of degradation of the fuel cell 31 described above is also referred to as a "degradation rate". The degradation rate corresponds to the cell voltage when a predetermined current per unit area is passed through the cells constituting the stack of the fuel cell 31, and takes a value of 0 to 100%. A degradation rate of 0% corresponds to the cell voltage in the initial state of the fuel cell 31 (state without degradation). The degradation rate of 100% corresponds to the cell voltage when the fuel cell 31 degrades and needs to be replaced.

Figure 5:
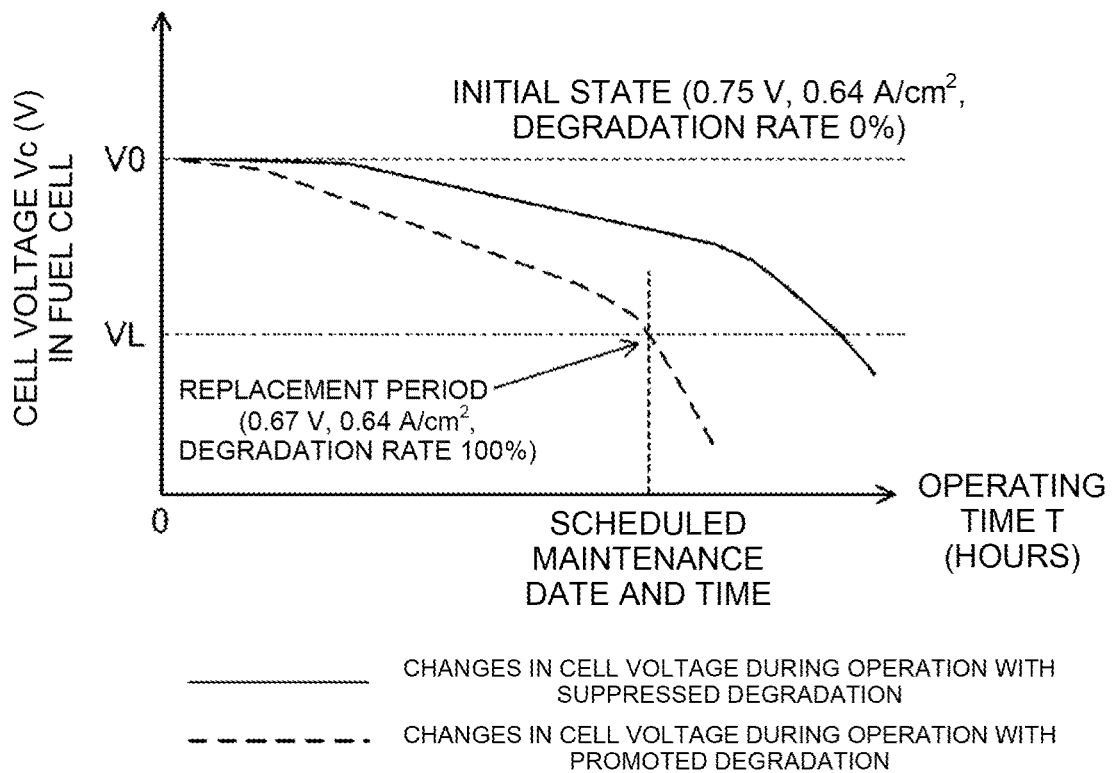
FIG. 5 is a graph showing the relationship between the operating time and the cell voltage of the fuel cell for the case of low load operation in which degradation is suppressed and the case of high load operation in which degradation is promoted.

FIG. 5 schematically shows the relationship between the operating time T (hours) of the fuel cell 31 and the cell voltage Vc (V). The cell voltage Vc on the vertical axis indicates the voltage per cell when a current of 0.6 A (that is, 0.6 A/cm$^2$) per unit area of the cell of the fuel cell stack is passed through the fuel cell. Here, in the initial state (operating time 0 hours) of the fuel cell 31, Vc=V0=0.75 V. That is, the fuel cell 31 having a cell voltage Vc of V0 has a degradation rate of 0%. The above-mentioned current value, voltage value, and the like are examples, and are not limited to the above-mentioned values. In FIG. 5, the solid line graph indicates the change in the cell voltage when low load operation in which degradation is suppressed is performed, and the dashed line graph indicates the change in the cell voltage when high load operation in which degradation is promoted is performed.

The degradation of the fuel cell 31 progresses as the operating time increases. As degradation of the fuel cell 31 progresses, the cell voltage V decreases as shown in FIG. 5. Here, the state of the fuel cell 31 when the cell voltage V reaches a value (V=VL=0.67 V) that is 10% lower than the initial state is defined as a degradation rate of 100%. As described above, it is desirable that the timing of reaching V=VL coincide with the maintenance date and time. The amount of decrease in the cell voltage and the cell voltage at which the degradation rate is taken to be 100% can be appropriately set according to the material, surface area, and the like of the electrodes (catalyst) of the fuel cell 31, and are not limited to the above-mentioned "10%" and "0.67 V".

[5. Adjustment of Fuel Cell Degradation Rate (Low Output Side)]

Figure 6:
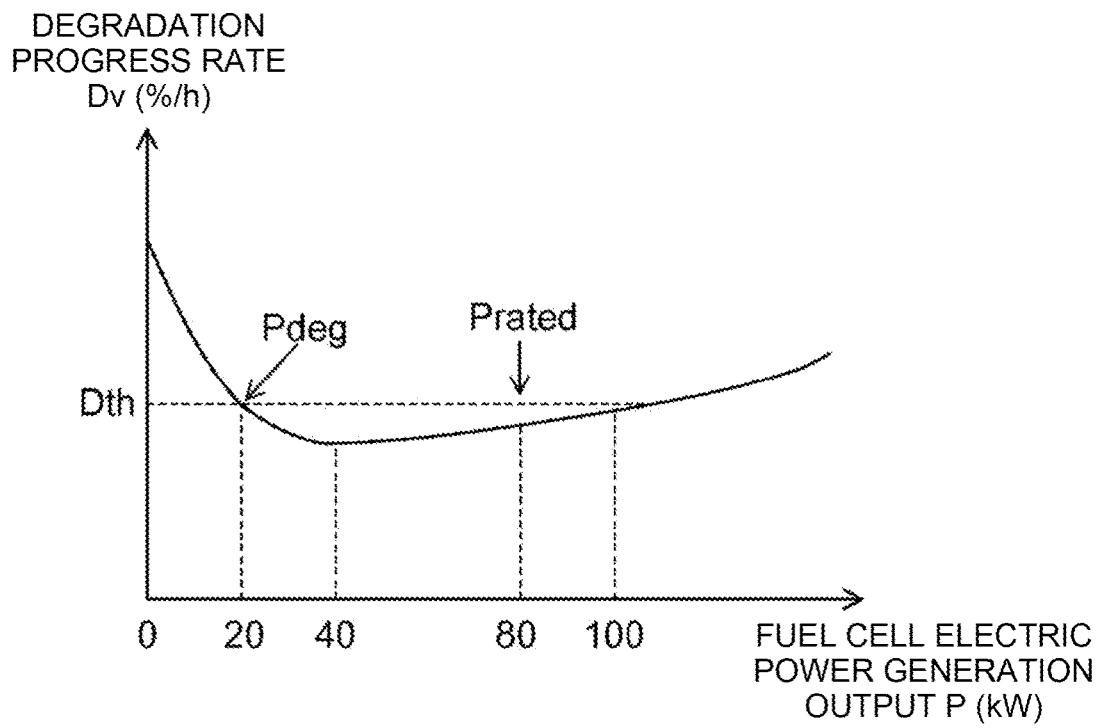
FIG. 6 is a graph showing the relationship between electric power generation output per fuel cell and the degradation progress rate.

FIG. 6 illustrates the relationship between the electric power generation output P per fuel cell and a degradation progress rate Dv (%/h). The degradation progress rate Dv refers to the amount of change (amount of decrease) in the degradation rate of the fuel cell 31 per unit time.

The above-mentioned low load operation refers to generating electricity in the fuel cell 31 in a region where the degradation progress rate Dv of the fuel cell 31 is low in the curve of FIG. 6. For example, an operation in which the electric power generation output P of the fuel cell 31 is 20 kW or more and 110 kW or less is a low load operation because the degradation progress rate Dv of the fuel cell 31 is equal to or less than a predetermined value Dth. If the fuel cell ship SH is completely stopped and the electric power generation output P of the fuel cell 31 is 0 (kW), the degradation progress rate Dv of the fuel cell 31 becomes the lowest at zero.

On the other hand, high load operation refers to generating electricity in the fuel cell 31 in a region where the degradation progress rate Dv of the fuel cell 31 is high in the curve of FIG. 6. For example, in an operation in which the electric power generation output P of the fuel cell 31 is less than 20 kW, or in an operation in which the electric power generation output P exceeds 110 kW, the degradation progress rate Dv of the fuel cell 31 becomes larger than the predetermined value Dth, and thus the operation is a high load operation.

For example, even if the fuel cell ship SH is completely stopped, in a case where the fuel cell 31 continues to generate electric power within the range where the electric power generation output P is 0<P≤20 kW for the purpose of driving the peripheral equipment 11 such as lighting equipment or the like, it can be seen from FIG. 6 that the degradation progress rate Dv of the fuel cell 31 exceeds the predetermined value Dth. In this state, the fuel cell 31 is operated at high load operation, and degradation of the fuel cell 31 is promoted. In addition, frequently repeating starting and stopping of the fuel cell 31 is the high load operation promoting degradation of the fuel cell 31, because such operation means that the operation of the fuel cell 31 in which the electric power generation output P is less than 20 kW is continued.

Here, the electric power generation output P of the fuel cell 31 when the degradation progress rate Dv of the fuel cell 31 is equal to the predetermined value Dth is defined as Pdeg. Based on FIG. 6, the electric power generation output Pdeg can also be said to be a lower limit value (for example, 20 kW) of the range (20≤P≤110 kW) of the electric power generation output P of the fuel cell 31 in which the degradation progress rate Dv of the fuel cell 31 is equal to or less than a predetermined value (predetermined value Dth).

Here, as can be seen in FIG. 6, in a case where Pdeg=20 kW, in a fuel cell ship SH equipped with six fuel cells 31, if the electric power consumed by the ship (electric power requirement) is 20 kW×6=120 kW or less, and if each fuel cell 31 is operated so that the electric power of 120 kW or less is evenly divided among the six fuel cells 31, degradation will be promoted in all the fuel cells 31. That is, the fuel cell 31 to be operated at low load operation is operated at high load operation. In this case, an estimated replacement period when the fuel cell 31 operated at low load operation needs to be replaced may be earlier than the initial scheduled replacement period (maintenance period).

Depending on the length of the time that the fuel cell ship SH is berthed, stopping the electric power generation may suppress the degradation or may promote the degradation. For example, if the berthing time of the fuel cell ship SH is short, the electric power generation by the fuel cell 31 will be restarted in a short time after the electric power generation is stopped. As described above, repeating the starting and stopping of electric power generation of the fuel cell 31 promotes degradation of the fuel cell 31, because such operation means that the operation of the fuel cell 31 in which the electric power generation output P is less than 20 kW is continued. On the other hand, if the berthing time of the fuel cell ship SH is long, the amount of time during which electric power generation of the fuel cell 31 is stopped becomes long, and thus the time during which the degradation progress rate of the fuel cell 31 is zero becomes long, and as a result, the degradation of the fuel cell 31 is suppressed.

Therefore, in the present embodiment, if the electric power generation output P of one of the fuel cells 31 falls below Pdeg, the electric power generation of at least one of the fuel cells 31 is stopped to adjust the degradation progress rate Dv and the degradation rate of the fuel cell 31. As a result, degradation of the fuel cell 31 can be promoted or suppressed, and the estimated replacement period of the fuel cell 31 can be brought closer to or coincided with the scheduled replacement period.

The control unit 12*a* of the present embodiment described above functions as a degradation rate control unit that adjusts the degradation rate of each of the plurality of fuel cells 31. That is, the fuel cell ship SH of the present embodiment includes the control unit 12*a* as a degradation rate control unit that adjusts the degradation rate indicating the degree of degradation of each of the plurality of fuel cells 31.

Figure 7:
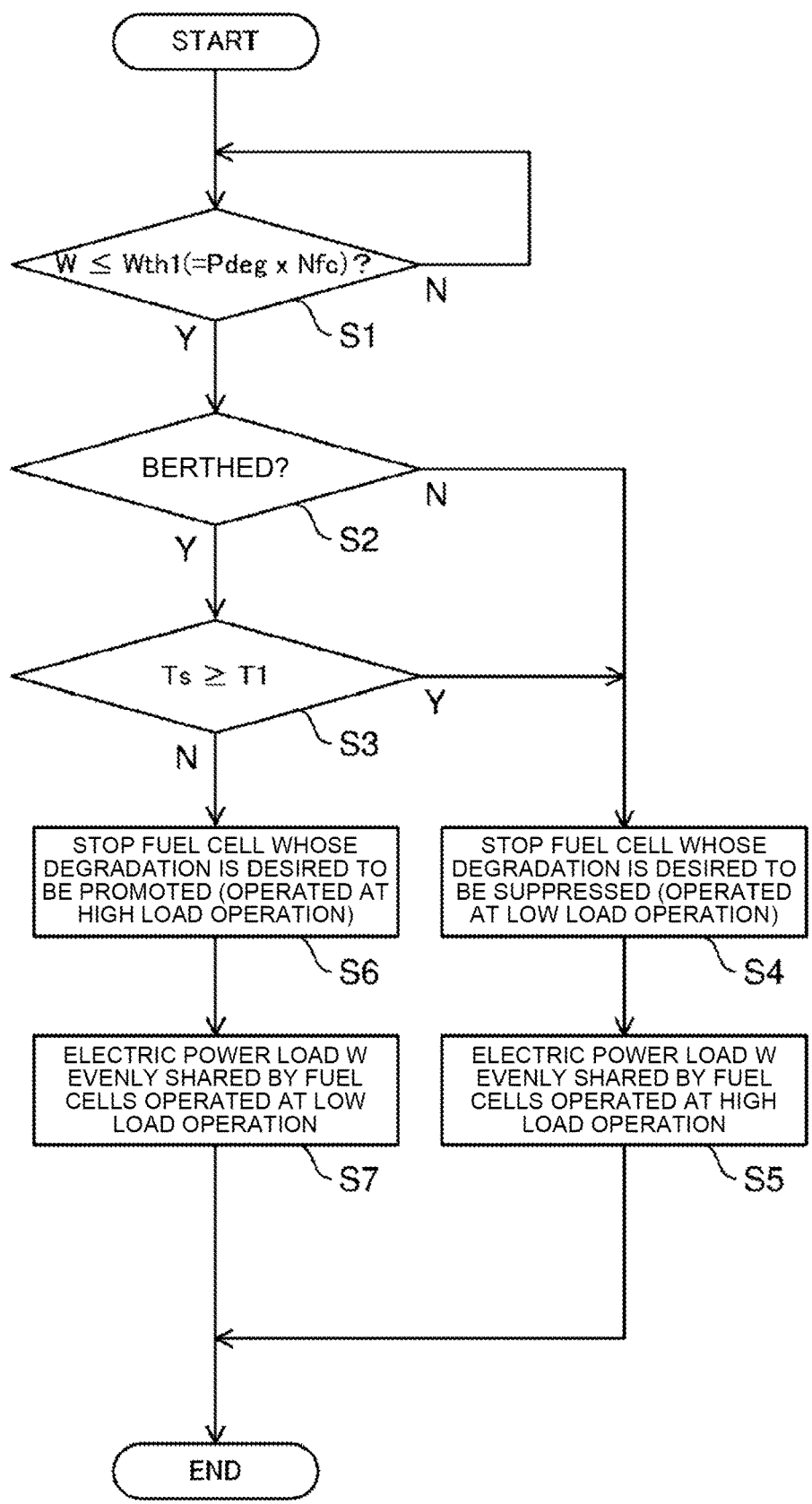
FIG. 7 is a flowchart illustrating a flow of adjusting the degradation rate of the fuel cell.

In the following, a procedure for adjusting the degradation rate of the fuel cell 31 by the control unit 12*a* will be described in detail. FIG. 7 is a flowchart illustrating a flow of adjusting the degradation rate of the fuel cell 31.

First, the control unit 12*a* determines whether the electric power load W (kW) consumed by the fuel cell ship SH is equal to or less than a first threshold value Wth1 (S1). Here, the first threshold value Wth1 is a value determined according to the above-mentioned electric power generation output Pdeg (kW) of one fuel cell and the number of fuel cells 31 mounted Nfc (units), and more specifically, Wth1=Pdeg× Nfc.

Figure 8:
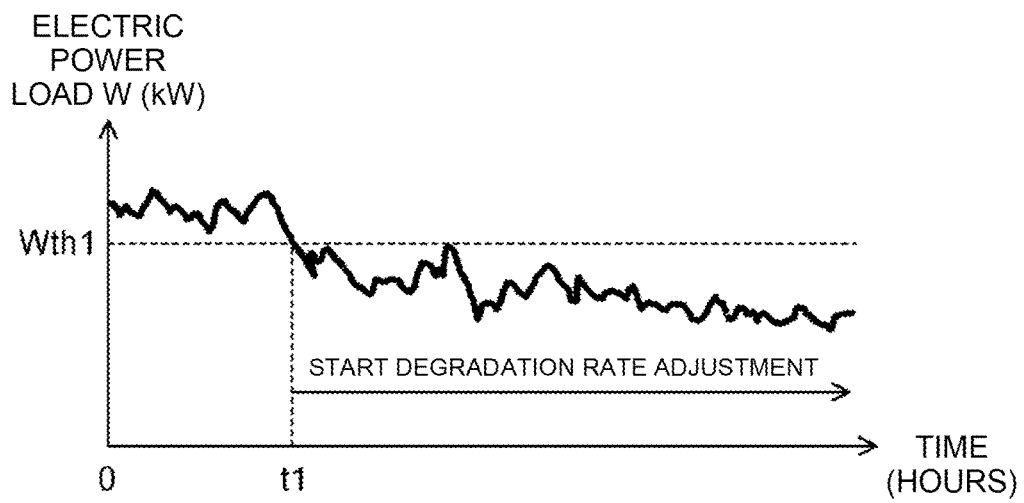
FIG. 8 is a graph showing an example of a transition of the electric power load of the fuel cell ship with respect to the passage of time.

FIG. 8 is a graph showing the transition of the electric power load W of the fuel cell ship SH with respect to the passage of time. The electric power load W of the fuel cell ship SH is the total electric power load consumed by the fuel cell ship SH, and also includes the power consumed by the peripheral equipment 11. As shown in FIG. 8, at the time t1 when W≤Wth1, the control unit 12*a* starts adjusting the degradation rate of the fuel cell 31. If W>Wth1 in S1, the control unit 12*a* stands by without adjusting the degradation rate.

In S1, if W≤Wth1, the control unit 12*a* then determines whether the fuel cell ship SH is berthed (S2). For example, if it is estimated, based on the operation plan of the fuel cell ship SH, that the electric power required in the ship will be smaller than a predetermined value for a certain period (for example, 48 hours), the control unit 12*a* can determine that the fuel cell ship SH is berthed. On the other hand, if the above situation is not estimated, the control unit 12*a* can determine that the fuel cell ship SH is not berthed.

If it is determined in S2 that the fuel cell ship SH is berthed, the control unit 12*a* determines whether the estimated berthing time Ts is equal to or longer than a predetermined time T1 (for example, 48 hours) (S3). The above-mentioned estimated berthing time Ts may be a time set in advance by the operator by operating an input unit, or may be a time acquired by machine learning based on the operation plan of the fuel cell ship SH.

If Ts≥T1 in S3, the control unit 12*a* stops the electric power generation of the fuel cell 31 whose degradation is desired to be suppressed, or in other words, the fuel cell 31 operated in the low load operation (S4). In this case, as described above, since the electric power generation of the fuel cell 31 is stopped for a long period, degradation of the fuel cell 31 operated in low load operation is suppressed. On the other hand, the fuel cell 31 operated at high load operation continues to generate electric power, and thus degradation progresses, and as a result, degradation is promoted. In S2, if the fuel cell ship SH is not berthed, the process also advances to S4. As a result, degradation of the fuel cell 31 operated at the low load operation is suppressed, and degradation of the fuel cell 31 operated at high load operation is promoted. If there are a plurality of fuel cells 31 operated at high load operation, the control unit 12*a* divides the electric power load Win S1 evenly by the number of fuel cells 31, and causes the fuel cells 31 to output the shared electric power (S5).

If Ts<T1 in S3, the control unit 12*a* stops the electric power generation of the fuel cell 31 whose degradation is desired to be promoted, or in other words, the fuel cell 31 operated at high load operation (S6). In this case, the fuel cell 31 operated at high load operation resumes (is planned to resume) electric power generation after a short stoppage period of electric power generation, and as a result, degradation is promoted. On the other hand, the fuel cell 31 operated in low load operation continues to generate electric power, but since repeating starting and stopping of electric power generation does not occur in a short period of time, degradation is not promoted and degradation is relatively suppressed. If there are a plurality of fuel cells 31 operated at low load operation, the control unit 12*a* divides the electric power load W in S1 evenly by the number of fuel cells 31, and causes the fuel cells 31 to output the shared electric power (S7).

Figure 9:
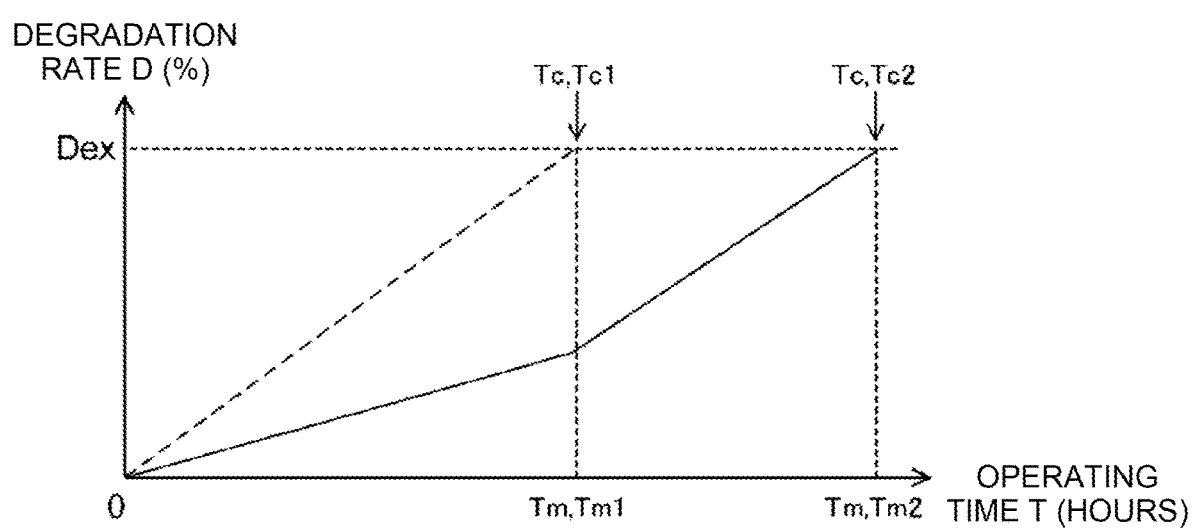
FIG. 9 is a graph schematically showing a change in the degradation rate with respect to the operating time of the fuel cell.

FIG. 9 schematically illustrates the change in the degradation rate D with respect to the operating time T of the fuel cell 31. The solid line graph in FIG. 9 indicates the change in the degradation rate D of the fuel cell 31 operated at low load operation in which degradation is suppressed, and the dashed line graph indicates the change in the degradation rate D of the fuel cell 31 operated at high load operation in which degradation is promoted. The degradation rate D suitable for replacing the fuel cell 31 is represented by Dex. In the present embodiment, Dex=100%.

By stopping the electric power generation of a predetermined fuel cell 31 as described above, the control unit 12*a* can adjust the degradation progress rate Dv of the fuel cell 31 and adjust the degradation rate D. This makes it possible to bring an estimated replacement period Tc1 of fuel cells 31 operated at high load operation closer to or coincided with a scheduled replacement period Tm1 which is the timing of entering the dock, and the fuel cells 31 operated at high load operation can be replaced during maintenance at the scheduled replacement period Tm1. Similarly, it possible to bring an estimated replacement period Tc2 of fuel cells 31 operated in low load operation closer to or coincided with a scheduled replacement period Tm2 which is the timing of entering the dock, and the fuel cells 31 operated in low load operation can be replaced during maintenance at the scheduled replacement period Tm2.

That is, when the period at which the degradation rate D of each fuel cell 31 reaches the degradation rate Dex suitable for replacement due to degradation of each fuel cell 31 is defined as an estimated replacement period Tc, and when the predetermined replacement period for each fuel cell 31 is defined as a scheduled replacement period Tm, the control unit 12*a*, as a degradation rate control unit, adjusts the degradation rate D of at least one of the fuel cells 31 during a predetermined period (for example, 10 years) from the start of operation so that for each of the fuel cells 31, the estimated replacement period Tc approaches or coincides with the scheduled replacement period Tm (in the example above, so that Tc1 approaches or coincides with Tm1 and Tc2 approaches or coincides with Tm2). As a result, the replacement work of each fuel cell 31 can be performed at the timing when the fuel cell ship SH enters the dock (for maintenance), and thus efficient operation of the fuel cell ship SH can be achieved. It is also possible to avoid a situation in which each fuel cell 31 degrades and reaches the end of its life while the fuel cell ship SH is sailing, and it becomes necessary to replace each of the fuel cells 31 while sailing.

The control unit 12a adjusts the degradation rate of the fuel cells 31 if the electric power load W consumed by the fuel cell ship SH becomes equal to or less than the first threshold value Wth1, which is determined according to the lower limit value Pdeg of the electric power generation output P of the fuel cells 31 which gives the degradation progress rate Dv of the fuel cells 31 is equal to or less than the predetermined value Dth and the number of fuel cells 31 mounted Nfc (S1 to S5). In addition, the control unit 12a changes the method of adjusting the degradation rate according to the estimated time (estimated berthing time Ts) during which the state in which the electric power load W is equal to or less than the first threshold value Wth1 is continued (S3, S4, S6).

If each fuel cell 31 is allowed to generate electricity with an equal output when the electric power load W of the ship is equal to or less than the first threshold value Wth1, degradation of all the fuel cells 31 is promoted. By adjusting the degradation rate when W Wth1, and changing the method of adjusting the degradation rate according to the estimated berthing time Ts, degradation can be suppressed for the fuel cells 31 operated at low load operation so that the estimated replacement period Tc2 approaches or coincides with the scheduled replacement period Tm2. For the fuel cell 31 operated at high load operation, degradation can be promoted so that the estimated replacement period Tc1 can be brought closer to or coincided with the scheduled replacement period Tm1.

The plurality of fuel cells 31 include the fuel cells 31 operated at high load operation and the fuel cells 31 operated at low load operation based on the operation plan of the fuel cell ship SH. The control unit 12a determines whether the fuel cell ship SH is expected to berth based on the operation plan (S2), and if such berthing is not expected, the control unit 12a stops the electric power generation of the fuel cells 31 operated at low load operation (S4). In this case, degradation of the fuel cells 31 operated at low load operation is suppressed, and thus for the fuel cells, it is possible to reduce situations in which the estimated replacement period Tc2 and the scheduled replacement period Tm2 are significantly different from each other.

If the estimated berthing time Ts of the fuel cell ship SH is equal to or longer than the predetermined time T1 determined according to the operation plan, the control unit 12a stops the electric power generation of the fuel cells 31 operated at low load operation (S3, S4). By stopping electric power generation for a long time, degradation of the fuel cells 31 operated at low load operation is suppressed. As a result, it is possible to reduce situations in which the estimated replacement period Tc2 and the scheduled replacement period Tm2 of the fuel cells 31 are significantly different from each other.

The control unit 12a evenly divides the electric power load W of the fuel cell ship SH by the number of the plurality of fuel cells 31 operated at high load operation, and causes each fuel cell 31 operated at high load operation to output the shared electric power (S5). In this case, it is possible to progress the degradation of the plurality of fuel cells 31 operated at high load operation at the same extent, and to align the timing at which each of the fuel cells 31 reaches the end of its life. As a result, the work of replacing the fuel cells 31 at the same time becomes very effective.

The control unit 12a stops the electric power generation of the fuel cells 31 operated at high load operation if the estimated berthing time Ts of the fuel cell ship SH is less than the predetermined time T1 (S6). The starting and stopping of electric power generation of the fuel cells 31 during a short period of time causes the degradation of the fuel cell 31 to progress. If Ts<T1, it is estimated that the fuel cells 31 operated at high load operation will be started after a short stoppage period of electric power generation (after the estimated berthing time Ts reaches the predetermined time T1). Promoting degradation due to stopping and starting of the fuel cells 31 in a short period of time makes it possible to bring the estimated replacement period Tc1 of the fuel cells 31 operated at high load operation closer to (or coincided with) the appropriate scheduled replacement period Tm1 based on the operation plan, and thus replacement work can be performed at an appropriate timing.

The control unit 12a evenly divides the electric power load W of the fuel cell ship SH by the number of the fuel cells 31 operated at low load operation, and causes each fuel cell 31 operated at low load operation to output the shared electric power (S7). In this case, it is possible to progress the degradation of the plurality of fuel cells 31 operated at low load operation at the same extent, and to align the timing at which each of the fuel cells 31 reaches the end of its life. As a result, the work of replacing the fuel cells 31 at the same time becomes very effective.

If degradation of the fuel cells 31 operated at high load operation has progressed more than expected and it is determined that the end of life will be reached earlier than the estimated replacement period Tc1, the degradation rate of the fuel cells 31 may be adjusted by temporarily switching the operation of the fuel cells 31 to low load operation.

[6. Adjustment of Fuel Cell Degradation Rate (High Output Side)]

As illustrated in FIG. 6 referred in the above description, the degradation progress rate Dv of the fuel cell 31 also increases when the electric power generation output P of the fuel cell 31 increases. This is because a large amount of current passed through each cell of the fuel cell 31 causes local temperature increase in the fuel cell 31 even if the fuel cell 31 is cooled by a cooling medium. Therefore, for example, if the fuel cell 31 operated at low load operation outputs electric power exceeding a rated output Prated (kW), degradation is promoted even though it is desired that degradation be suppressed.

Therefore, in the present embodiment, if the electric power load W of the fuel cell ship SH is large, the control unit 12a, functioning as a degradation rate control unit, performs the following control to suppress degradation of the fuel cell 31 operated at low load operation. This aspect will be described in the following.

Figure 10:
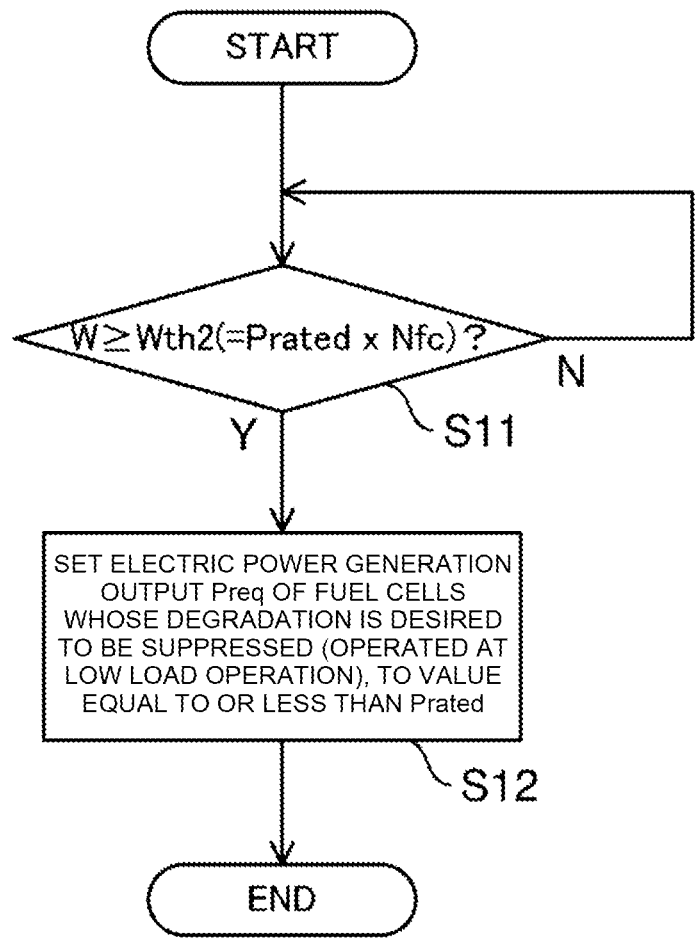
FIG. 10 is flowchart illustrating another flow of adjusting the degradation rate of the fuel cell.

FIG. 10 is another flowchart illustrating a flow of adjusting the degradation rate of the fuel cell 31. First, the control unit 12a determines whether the electric power load W consumed by the fuel cell ship SH is equal to or greater than a second threshold value Wth2 (S11). Here, the second threshold Wth2 is a value determined according to the rated output Prated of one fuel cell and the number of fuel cells 31 mounted Nfc (units), and specifically, Wth2=Prated×Nfc.

Prated, for example, is 80 (kW) (see FIG. 6), but is not limited to this value, and can be appropriately set according to the material, surface area, and the like of the electrodes of the fuel cell 31. When the maximum output of the fuel cell 31 is represented by Pmax (kW), Prated<Pmax.

In S11, if W≥Wth2, the control unit 12a adjusts the degradation rate of at least one of the fuel cells 31 (S12). For example, the control unit 12a sets an electric power generation output Preq (kW) of the fuel cells 31 whose degradation is to be suppressed, that is, the fuel cells 31 operated at low load operation, to a value equal to or less than the rated output Prated (S12). In other words, fuel cells 31 operated at low load operation are operated to output the electric power generation output Preq that satisfies Preq Prated. As a result, the electric power generation output of fuel cells 31 operated at low load operation is suppressed to Preq, and thus the degradation of the fuel cells 31 is suppressed and the degradation rate is lowered. In this case, the control unit 12a may set the electric power generation output of the fuel cells 31 operated at high load operation, to a value equal to or higher than the rated output Prated. In this case, the degradation rate of the fuel cells 31 operated at high load operation can be increased to promote the degradation.

As described above, if the electric power load W consumed by the fuel cell ship SH is equal to or higher than the second threshold value Wth2 determined according to the rated output Prated of the fuel cells 31 and the number of fuel cells 31 mounted Nfc, the control unit 12a adjusts the degradation rate of (at least one of) the fuel cells 31. As a result, even if the electric power load W of the fuel cell ship SH is large, the degradation rate of the fuel cells 31 operated at low load operation can be lowered to suppress degradation. Therefore, it is possible to avoid situations in which degradation of the fuel cells 31 operated at low load operation is promoted even though it is desired to suppress degradation. On the other hand, for fuel cells 31 operated at high load operation, the degradation rate can be increased and the degradation can be promoted as described above.

Of the plurality of fuel cells 31, the control unit 12a sets the electric power generation output Preq of the fuel cells 31 operated at low load operation, that is, the fuel cells 31 whose degradation is to be suppressed, to a value equal to or less than the rated output Prated (S12). As a result, even if the electric power load W of the fuel cell ship SH is large, degradation of the fuel cells 31 operated at low load operation can be reliably suppressed.

[7. Internal Structure of Fuel Cell Ship]

Figure 11:
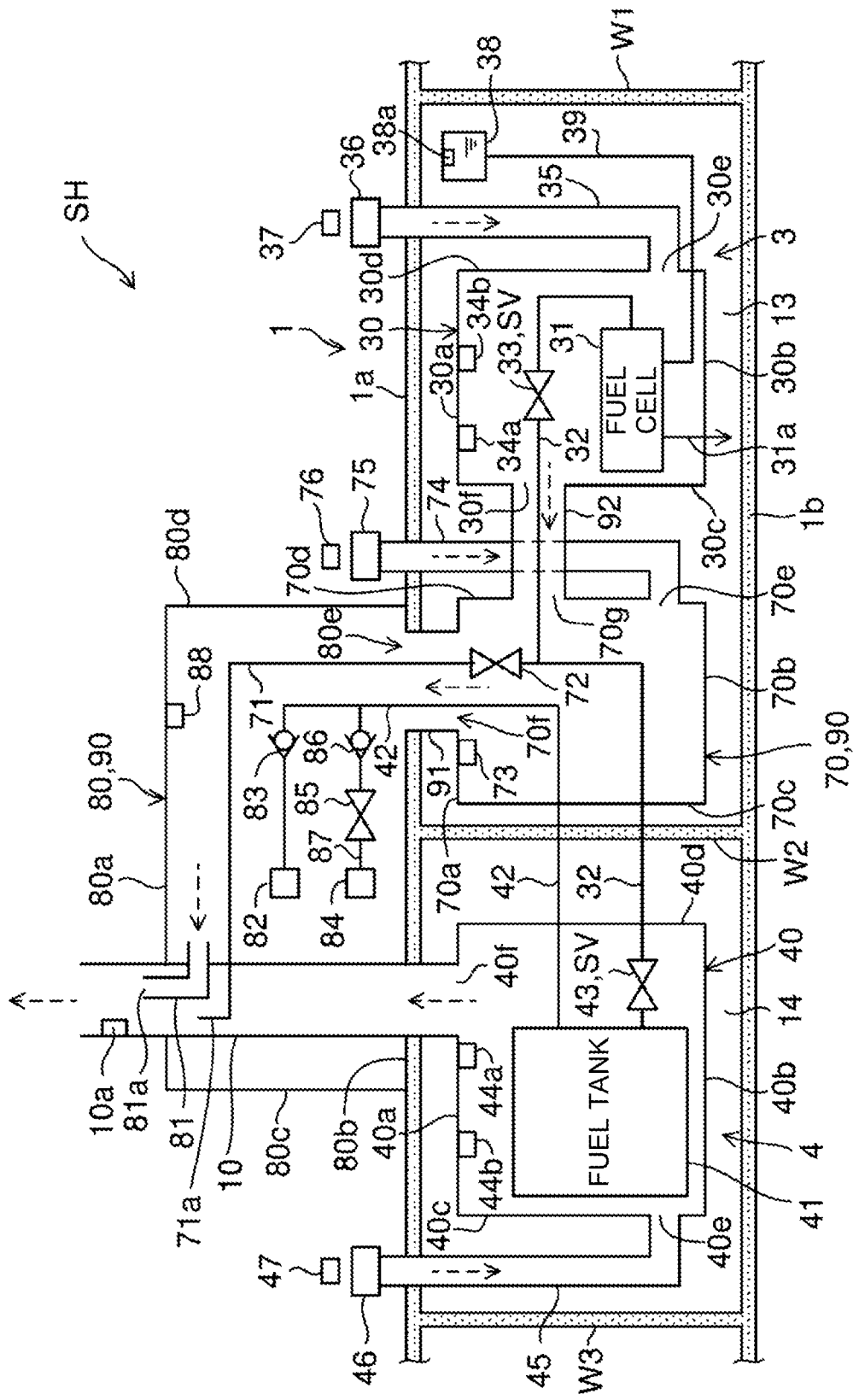
FIG. 11 is an explanatory diagram schematically illustrating an internal structure of the fuel cell ship.

Next, the internal structure of the above-described fuel cell ship SH will be described in detail. FIG. 11 is an explanatory diagram schematically illustrating the internal structure of the fuel cell ship SH. In FIG. 11, the air flow is indicated by a dashed line arrow. Each member is illustrated in FIG. 11 in which the right side of the drawing is the bow side and the left side of the drawing is the stern side. However, the position of each member is not limited to the position illustrated in FIG. 11 as long as the connection relationship between each member is maintained.

The fuel cell ship SH includes an engine room 13 and a fuel room 14. The engine room 13 and the fuel room 14 are arranged below a deck 1a of the hull 1. In other words, the engine room 13 and the fuel room 14 are arranged between the deck 1a and a bottom plate 1b of the hull 1. The bottom plate 1b is located between the deck 1a and the ship bottom portion 1c (see FIG. 1).

The engine room 13 is located on the bow side with respect to the fuel room 14. Below the deck 1a, partition walls W1, W2 and W3 are located in order from the bow side to the stern side. The engine room 13 is separated from other spaces by the partition walls W1 and W2. The fuel room 14 is separated from other spaces by the partition walls W2 and W3. The partition walls W1 to W3 are made of, for example, fiber reinforced plastics (FRP), but may be iron plates.

(7-1. Configuration of Fuel Cell System)

The fuel cell system 3 of the fuel cell ship SH is located in the engine room 13. The fuel cell system 3 includes the above-described fuel cells 31, the fuel gas supply pipe 32, and a fuel cell side shutoff valve 33. The fuel cell side shutoff valve 33 is an example of peripheral equipment 11 (see FIG. 1).

The fuel gas supply pipe 32 is a fuel supply pipe for supplying, to the anode electrode of the fuel cell 31, the fuel gas stored in the fuel tank 41 (described later) of the fuel gas storage unit 4.

The fuel cell side shutoff valve 33 is an example of a shutoff valve SV that opens or closes the flow path of the fuel gas supply pipe 32. The opening and closing of the fuel cell side shutoff valve 33 is controlled by the control unit 12a (see FIG. 1). Specifically, the fuel cell side shutoff valve 33 switches between supplying the fuel gas from the fuel tank 41 to the fuel cells 31 and stopping the supply of fuel gas based on the control of the control unit 12a. Although only one fuel cell side shutoff valve 33 is provided in the fuel gas supply pipe 32 in a fuel cell compartment 30 (described later), two or more may be provided.

The fuel cell ship SH further includes the fuel cell compartment 30. The fuel cell compartment 30 is a housing body for housing the fuel cell 31, and is arranged in the engine room 13. In FIG. 11, for convenience, only one fuel cell compartment 30 is illustrated. However, the fuel cell ship SH of the present embodiment has the plurality of fuel cells 31 as described above (see FIG. 2 and the like), and thus a plurality of fuel cell compartments 30 are provided corresponding to each fuel cell 31.

The fuel cell compartment 30 has a hollow shape. For example, the fuel cell compartment 30 has a hollow and substantially rectangular parallelepiped shape. In this case, the outer walls of the fuel cell compartment 30 include, for example, a top wall 30a, a bottom wall 30b, a front wall (not illustrated), a back wall (not illustrated), a side wall 30c, and a side wall 30d. However, the top surface, bottom surface, front surface, back surface, and side surfaces of the fuel cell compartment 30 can be arbitrarily determined. The shape of the fuel cell compartment 30 is not particularly limited as long as the fuel cell compartment 30 has a space that can house the fuel cell 31. The fuel cell compartment 30 can also be considered as a container, chamber, or box for housing the fuel cell 31. The material of the outer wall of the fuel cell compartment 30 is, for example, FRP, but may be an iron plate.

A cell compartment air supply port 30e with an opening is provided on the side wall 30d of the fuel cell compartment 30. The cell compartment air supply port 30e is connected to a cell compartment air supply pipe 35, which will be described later. The cell compartment air supply port 30e may be provided on an outer wall other than the side wall 30d in the fuel cell compartment 30.

On the other hand, a cell compartment exhaust port 30f with an opening is provided on the side wall 30c of the fuel cell compartment 30. The cell compartment exhaust port 30f communicates with a duct compartment 90, which will be described later. The cell compartment exhaust port 30f may be provided on an outer wall other than the side wall 30c in the fuel cell compartment 30.

The fuel cell compartment 30 has an interior that is a closed space, with the exception of the cell compartment air supply port 30e and the cell compartment exhaust port 30f.

A part of the fuel gas supply pipe 32 described above and the fuel cell side shutoff valve 33 are housed in the fuel cell compartment 30. The fuel cell compartment 30 further houses a cell compartment internal gas detector 34a and a cell compartment internal fire detector 34b.

The cell compartment internal gas detector 34a is a fuel gas detector arranged inside the fuel cell compartment 30. For example, if the fuel gas is hydrogen gas, the cell compartment internal gas detector 34a includes a hydrogen gas detection sensor.

The cell compartment internal gas detector 34a is arranged on an inner surface of the top wall 30a located at an upper part of the fuel cell compartment 30. Hydrogen gas as the fuel gas is lighter than air and rises. Therefore, by arranging the cell compartment internal gas detector 34a on the top wall 30a of the fuel cell compartment 30, a leaked fuel gas can be reliably detected by the cell compartment internal gas detector 34a even if the fuel gas leaks in the fuel cell compartment 30. The installation position of the cell compartment internal gas detector 34a may be located on the most downstream side of the flow path through which the fuel gas flows when the fuel gas leaks in the fuel cell compartment 30.

If the cell compartment internal gas detector 34a detects the fuel gas in the fuel cell compartment 30, a detection signal is sent from the cell compartment internal gas detector 34a to the control unit 12a. As a result, the control unit 12a can control the fuel cell side shutoff valve 33 provided in the fuel gas supply pipe 32 to stop the supply of fuel gas from the fuel tank 41 to the fuel cell 31.

The cell compartment internal fire detector 34b is a fire detector arranged inside the fuel cell compartment 30. The cell compartment internal fire detector 34b includes, for example, one or more sensors among a smoke sensor for detecting smoke, a heat sensor for detecting heat, and a flame sensor for detecting flame. The cell compartment internal fire detector 34b may include a thermocouple type fire detector.

The cell compartment internal fire detector 34b is arranged on an inner surface of the top wall 30a located at an upper part of the fuel cell compartment 30. In the unlikely event that a fire occurs inside the fuel cell compartment 30, the cell compartment internal fire detector 34b detects the fire and outputs a detection signal indicating that a fire has occurred to the control unit 12a (see FIG. 2). In this case, the control unit 12a can control the fuel cell side shutoff valve 33 to stop the supply of fuel gas from the fuel tank 41 to the fuel cell 31. As a result, in the fuel cell compartment 30, the risk of explosion due to ignition of the fuel gas can be reduced as much as possible.

The cell compartment air supply pipe 35 is connected to the fuel cell compartment 30. The cell compartment air supply pipe 35 extends from the cell compartment air supply port 30e of the fuel cell compartment 30, to the deck 1a and is exposed from the upper surface of the deck 1a.

A cell compartment air supply device 36 and a cell compartment external gas detector 37 are arranged at an end portion on the deck 1a side of the cell compartment air supply pipe 35. The cell compartment air supply device 36 and the cell compartment external gas detector 37 are located above the deck 1a.

The cell compartment air supply device 36 includes, for example, an inexpensive non-explosion-proof air supply fan, but may include an explosion-proof air supply fan. The drive of the cell compartment air supply device 36 is controlled by the control unit 12a. One or more filters (not illustrated) may be arranged in the cell compartment air supply device 36. The filter removes, for example, dust or sea salt particles.

The cell compartment air supply device 36 supplies air outside the fuel cell compartment 30 to the inside of the fuel cell compartment 30 via the cell compartment air supply pipe 35 and the cell compartment air supply port 30e. The air inside the fuel cell compartment 30 is discharged to the duct compartment 90 via the cell compartment exhaust port 30f. In this way, the inside of the fuel cell compartment 30 is ventilated. As a result, it is possible to prevent combustible gas (for example, the fuel gas leaking from the fuel cell 31) from being retained in the fuel cell compartment 30.

The cell compartment external gas detector 37 detects combustible gas (for example, hydrogen gas floating around the hull 1) flowing into the fuel cell compartment 30 from the outside. The cell compartment external gas detector 37 is, for example, a combustible gas sensor such as a hydrogen gas sensor. The cell compartment external gas detector 37 is arranged on a side opposite to the cell compartment air supply pipe 35 with respect to the cell compartment air supply device 36, that is, on the upstream side of the air flow from the outside to the inside of the fuel cell compartment 30. The cell compartment external gas detector 37 may include a gas sensor that detects a combustible gas other than hydrogen gas. Examples of combustible gases other than hydrogen gas include methane, ethane, propane, and carbon monoxide.

The cell compartment external gas detector 37 outputs, for example, a detection signal indicating the concentration of combustible gas to the control unit 12a. As a result, the control unit 12a can determine, based on the detection signal, whether the concentration of the combustible gas is equal to or higher than a standard value. Then, if the concentration is equal to or higher than the standard value, the control unit 12a can control the fuel cell side shutoff valve 33 to stop the supply of fuel gas from the fuel tank 41 to the fuel cell 31. The above-mentioned standard value may be determined based on experiments and/or experience.

The fuel cell ship SH further includes a cooling medium tank 38 and a cooling medium pipe 39. The cooling medium tank 38 stores cooling medium for cooling the fuel cells 31. The cooling medium is, for example, an antifreeze liquid having low electrical conductivity. The antifreeze liquid is, for example, a liquid obtained by mixing pure water and ethylene glycol in a predetermined ratio. The cooling medium tank 38 is sealed, but an upper portion may be open.

The cooling medium pipe 39 is a pipe for circulating the cooling medium between the fuel cells 31 and a heat exchanger (not illustrated). A circulation pump (not illustrated) is also provided at a location along the cooling medium pipe 39. The fuel cells 31 are cooled by driving the circulation pump to supply the cooling medium from the heat exchanger to the fuel cells 31 via the cooling medium pipe 39. The cooling medium supplied for cooling the fuel cells 31 is also supplied, via the cooling medium pipe 39, to the cooling medium tank 38, at which a volume change due to a temperature change of the cooling medium is absorbed and the amount of the cooling medium liquid is monitored.

A cooling tank internal gas detector 38a is provided in an upper portion inside the cooling medium tank 38. The cooling tank internal gas detector 38a is a fuel gas detector that detects the fuel gas existing in the cooling medium tank 38. As the fuel gas existing in the cooling medium tank 38, for example, a fuel gas which is leaked in the fuel cell 31 and then enters into the cooling medium tank 38 via the cooling medium pipe 39 can be considered. The fuel gas detection result (for example, fuel gas concentration information) by the cooling tank internal gas detector 38*a* is sent to the control unit 12*a*. As a result, the control unit 12*a* determines, based on the detection result of the cooling tank internal gas detector 38*a*, whether there is a fuel gas leak in the fuel cells 31, and if there is a leak, the control unit 12*a* can, for example, perform control to stop electric power generation by the fuel cells 31.

(7-2. Configuration of Fuel Gas Storage Unit)

The fuel gas storage unit 4 of the fuel cell ship SH has the above-described fuel tank 41, a gas filling pipe 42, and a tank side shutoff valve 43. The tank side shutoff valve 43 is an example of the peripheral equipment 11.

The fuel tank 41 stores the fuel gas as fuel to be supplied to the fuel cells 31. In FIG. 11, for convenience, only one fuel tank 41 is illustrated, but the number of fuel tanks 41 is not particularly limited and there may be a plurality of the fuel tanks 41 (see FIG. 2).

The gas filling pipe 42 is a pipe for replenishing the fuel tank 41 with the fuel gas or filling the fuel tank 41 with an inert gas. One end side of the gas filling pipe 42 is connected to the fuel tank 41. The other end side of the gas filling pipe 42 is branched into two, and these ends are connected to a fuel gas filling port 82 and an inert gas filling port 84, respectively. The fuel gas filling port 82 and the inert gas filling port 84 are provided in the duct compartment 90 (particularly an upper duct compartment 80) described later.

The above-mentioned inert gas is, for example, nitrogen gas. For example, if the fuel gas remains in the fuel tank 41 when performing maintenance such as inspection or repair of the fuel cell ship SH in the dock (dry dock), there is a danger that an explosion may occur when the fuel gas ignites for some reason. Therefore, at the time of maintenance of the fuel cell ship SH, the fuel tank 41 is filled with the inert gas, and the fuel gas is removed from the fuel tank 41. As a result, it possible to avoid the danger of explosion.

In the fuel gas supply pipe 32 described above, a side opposite to the connection side with the fuel cell 31 is connected to the fuel tank 41. That is, the fuel tank 41 and the fuel cell 31 are connected via the fuel gas supply pipe 32.

The tank side shutoff valve 43 is an example of a shutoff valve SV that opens or closes the flow path of the fuel gas supply pipe 32. The opening and closing of the tank side shutoff valve 43 is controlled by the control unit 12*a*. More specifically, the tank side shutoff valve 43 switches between supplying the fuel gas from the fuel tank 41 to the fuel cells 31 and stopping the supply of fuel gas based on the control of the control unit 12*a*. Although only one tank side shutoff valve 43 is provided in the fuel gas supply pipe 32 in a tank compartment 40 described later, two or more tank side shutoff valves 43 may be provided.

That is, it can be said that the fuel gas supply pipe 32 connecting the fuel tank 41 and the fuel cell 31 has at least two shutoff valves SV. The at least two shutoff valves SV include the fuel cell side shutoff valve 33 and the tank side shutoff valve 43.

The fuel cell ship SH further includes the tank compartment 40. The tank compartment 40 is a housing body that houses at least one fuel tank 41. The tank compartment 40 is arranged in the fuel room 14. The number of tank compartments 40 is not particularly limited, and may be one or more.

The tank compartment 40 has a hollow shape. For example, the tank compartment 40 has a hollow and substantially rectangular parallelepiped shape. In this case, the outer walls of the tank compartment 40 include, for example, a top wall 40*a*, a bottom wall 40*b*, a front wall (not illustrated), a back wall (not illustrated), a side wall 40*c*, and a side wall 40*d*. However, the top surface, bottom surface, front surface, back surface, and side surfaces of the tank compartment 40 can be arbitrarily determined. The shape of the tank compartment 40 is not particularly limited as long as the tank compartment 40 has a space that can house at least one fuel tank 41. The tank compartment 40 can also be considered as a container, chamber, or box for housing the fuel tank 41. The material of the outer wall of the tank compartment 40 is, for example, FRP, but may be an iron plate.

A tank compartment air supply port 40*e* with an opening is provided on the side wall 40*c* of the tank compartment 40. The tank compartment air supply port 40 is connected to a tank compartment air supply pipe 45 described later. The tank compartment air supply port 40*e* may be provided on an outer wall other than the side wall 40*c* in the tank compartment 40.

On the other hand, a tank compartment exhaust port 40*f* with an opening is provided on the top wall 40*a* of the tank compartment 40. The tank compartment exhaust port 40*f* communicates with a vent pipe 10. The vent pipe 10 is a pipe for guiding air inside the tank compartment 40 to the outside of the ship. The tank compartment exhaust port 40*f* may be provided on an outer wall other than the top wall 40*a* in the tank compartment 40.

The tank compartment 40 has an interior that is a closed space except for the tank compartment air supply port 40*e* and the tank compartment exhaust port 40*f*.

A part of the fuel gas supply pipe 32 described above and the tank side shutoff valve 43 are housed in the tank compartment 40. The tank compartment 40 further houses a tank compartment internal gas detector 44*a* and a tank compartment internal fire detector 44*b*.

The tank compartment internal gas detector 44*a* is a fuel gas detector arranged inside the tank compartment 40. For example, if the fuel gas is hydrogen gas, the tank compartment internal gas detector 44*a* includes a hydrogen gas detection sensor.

The tank compartment internal gas detector 44*a* is arranged on the top wall 40*a* located at the upper part of the tank compartment 40 to be close to the tank compartment exhaust port 40*f* or inside the tank compartment exhaust port 40*f*. In the unlikely event that the fuel gas leaks from the fuel tank 41 in the tank compartment 40, the leaked fuel gas goes toward the vent pipe 10 through the tank compartment exhaust port 40*f*. That is, the tank compartment exhaust port 40*f* is located on the most downstream side of the flow path through which the fuel gas flows when the fuel gas leaks inside the tank compartment 40. Therefore, by arranging the tank compartment internal gas detector 44*a* at a position near the tank compartment exhaust port 40*f* or inside the tank compartment exhaust port 40*f*, a fuel gas leaked in the tank compartment 40 can be reliably detected by the tank compartment internal gas detector 44*a* located on the most downstream side of the flow path, regardless of where the fuel gas leaks.

If the tank compartment internal gas detector 44*a* detects the fuel gas inside the tank compartment 40, a detection signal is sent from the tank compartment internal gas detector 44*a* to the control unit 12*a*. As a result, the control unit 12*a* can control the tank side shutoff valve 43 and the fuel cell side shutoff valve 33 provided in the fuel gas supply pipe 32 to stop the supply of fuel gas from the fuel tank 41 to the fuel cells 31, and can also open a release valve 72 to release the high-pressure hydrogen remaining inside the pipe.

The tank compartment internal fire detector 44b is a fire detector arranged inside the tank compartment 40. The tank compartment internal fire detector 44b includes, for example, one or more sensors among a smoke sensor for detecting smoke, a heat sensor for detecting heat, and a flame sensor for detecting flame. The tank compartment internal fire detector 44b may include a thermocouple type fire detector.

The tank compartment internal fire detector 44b is arranged on an inner surface of the top wall 40a located at an upper part of the tank compartment 40. In the unlikely event that a fire occurs inside the tank compartment 40, the tank compartment internal fire detector 44b detects the fire and outputs a detection signal indicating that a fire has occurred to the control unit 12a. In this case, the control unit 12a can control the tank side shutoff valve 43 and the fuel cell side shutoff valve 33 to stop the supply of fuel gas from the fuel tank 41 to the fuel cells 31, and can also open a release valve 72 to release the high-pressure hydrogen remaining inside the pipe. As a result, in the tank compartment 40, the risk of explosion due to ignition of the fuel gas can be reduced as much as possible.

The tank compartment air supply pipe 45 is connected to the tank compartment 40. The tank compartment air supply pipe 45 extends from the tank compartment air supply port 40e of the tank compartment 40 to the deck 1a, and is exposed from an upper surface of the deck 1a.

A tank compartment air supply device 46 and a tank compartment external gas detector 47 are arranged at an end portion on the deck 1a side of the tank compartment air supply pipe 45. The tank compartment air supply device 46 and the tank compartment external gas detector 47 are located above the deck 1a.

The tank compartment air supply device 46 includes, for example, an inexpensive non-explosion-proof air supply fan, but may include an explosion-proof air supply fan. The drive of the tank compartment air supply device 46 is controlled by the control unit 12a. One or more filters (not illustrated) may be arranged in the tank compartment air supply device 46. The filter removes, for example, dust or sea salt particles.

The tank compartment air supply device 46 supplies air outside the tank compartment 40 to the inside of the tank compartment 40 via the tank compartment air supply pipe 45 and the tank compartment air supply port 40e. The air inside the tank compartment 40 is discharged to the vent pipe 10 via the tank compartment exhaust port 40f. In this way, the inside of the tank compartment 40 is ventilated. As a result, even if the fuel gas leaks from the fuel tank 41 in the tank compartment 40, the retention of the fuel gas can be suppressed.

The tank compartment external gas detector 47 detects combustible gas (for example, hydrogen gas floating around the hull 1) flowing into the tank compartment 40 from the outside. The tank compartment external gas detector 47 is, for example, a combustible gas sensor such as a hydrogen gas sensor. The tank compartment external gas detector 47 is arranged on a side opposite to the tank compartment air supply pipe 45 with respect to the tank compartment air supply device 46, that is, on the upstream side of the air flow from the outside to the inside of the tank compartment 40. The tank compartment external gas detector 47 may include a gas sensor that detects a combustible gas other than hydrogen gas.

The tank compartment external gas detector 47 outputs, for example, a detection signal indicating the concentration of combustible gas to the control unit 12a. As a result, the control unit 12a can determine, based on the detection signal, whether the concentration of the combustible gas is equal to or higher than a standard value. If the concentration is equal to or greater than a standard value, the control unit 12a can control the tank side shutoff valve 43 and the fuel cell side shutoff valve 33 to stop the supply of fuel gas from the fuel tank 41 to the fuel cells 31, and can also open the release valve 72 to release the high-pressure hydrogen remaining inside the pipe. The above-mentioned standard value may be determined based on experiments and/or experience.

(7-3. Duct Compartment)

The fuel cell ship SH further includes a lower duct compartment 70 and an upper duct compartment 80. Here, the lower duct compartment 70 and the upper duct compartment 80 are collectively referred to as a duct compartment 90. The duct compartment 90 is a housing body that houses various pipes. For example, the duct compartment 90 houses a part of the fuel gas supply pipe 32. The inside of the lower duct compartment 70 and the inside of the upper duct compartment 80 communicate with each other via a duct communication portion 91. In the following, details of the lower duct compartment 70 and the upper duct compartment 80 will be described.

<7-3-1. Lower Duct Compartment>

The lower duct compartment 70 is located below the deck 1a. More specifically, the lower duct compartment 70 is arranged in the engine room 13. In the engine room 13, the lower duct compartment 70 is located on the stern side with respect to the fuel cell compartment 30. That is, below the deck 1a, the lower duct compartment 70 is located between the fuel cell compartment 30 and the tank compartment 40. The lower duct compartment 70 houses a part of the fuel gas supply pipe 32 and a part of the gas filling pipe 42.

Here, the "part of the fuel gas supply pipe 32" housed in the lower duct compartment 70 refers to a portion of the fuel gas supply pipe 32 located between the fuel cell compartment 30 and the tank compartment 40. The "part of the gas filling pipe 42" housed in the lower duct compartment 70 refers to a portion of the gas filling pipe 42 located between the tank compartment 40 and the upper duct compartment 80.

The material of the lower duct compartment 70 is, for example, FRP, but may be an iron plate. The lower duct compartment 70 has a hollow shape. For example, the lower duct compartment 70 has a hollow and substantially rectangular parallelepiped shape. In this case, the outer walls of the lower duct compartment 70 include, for example, a top wall 70a, a bottom wall 70b, a front wall (not illustrated), a back wall (not illustrated), a side wall 70c, and a side wall 70d. However, the top surface, bottom surface, front surface, back surface, and side surfaces of the lower duct compartment 70 can be arbitrarily determined. The shape of the lower duct compartment 70 is not particularly limited as long as the lower duct compartment 70 has a space that can house a part of the fuel gas supply pipe 32 and the like. The lower duct compartment 70 can also be regarded as a container, a chamber, or a box for housing a part of the fuel gas supply pipe 32 and the like.

A lower duct compartment air supply port 70e with an opening is provided in the side wall 70d of the lower duct compartment 70. The lower duct compartment air supply port 70e is connected to a lower duct compartment air supply pipe 74 described later. The lower duct compartment air supply port 70e may be provided on an outer wall other than the side wall 70d in the lower duct compartment 70.

On the other hand, a lower duct compartment communication port 70*f* with an opening is provided in the top wall 70*a* of the lower duct compartment 70. The lower duct compartment communication port 70*f* communicates with the duct communication portion 91 described above. The lower duct compartment communication port 70*f* may be provided on an outer wall other than the top wall 70*a* in the lower duct compartment 70.

A cell compartment communication port 70*g* with an opening is provided in the side wall 70*d* of the lower duct compartment 70. The cell compartment communication port 70*g* is connected to the cell compartment exhaust port 30*f* of the fuel cell compartment 30 described above via a communication pipe 92. As a result, the air inside the fuel cell compartment 30 flows into the lower duct compartment 70 via the cell compartment exhaust port 30*f*, the communication pipe 92, and the cell compartment communication port 70*g*. The cell compartment communication port 70*g* may be provided on an outer wall other than the side wall 70*d* in the lower duct compartment 70.

The communication pipe 92 includes, for example, a double pipe having an inner pipe and an outer pipe. Examples of the inner pipe include the fuel gas supply pipe 32. The outer pipe is located on the outside of the inner pipe in the radial direction. The gas inside the fuel cell compartment 30 travels between the inner pipe and the outer pipe of the communication pipe 92, from the cell compartment exhaust port 30*f* to the cell compartment communication port 70*g* of the lower duct compartment 70.

The lower duct compartment 70 has a closed space inside except for the lower duct compartment air supply port 70*e*, the lower duct compartment communication port 70*f*, and the cell compartment communication port 70*g*.

The lower duct compartment 70 houses a part of a fuel gas discharge pipe 71. The fuel gas discharge pipe 71 is a pipe provided by branching from the fuel gas supply pipe 32 located in the lower duct compartment 70. For example, the fuel gas discharge pipe 71 is provided by branching from the fuel gas supply pipe 32 between the two shutoff valves SV.

More specifically, the fuel gas discharge pipe 71 is provided by branching from the fuel gas supply pipe 32 between the tank side shutoff valve 43 in the tank compartment 40 and the fuel cell side shutoff valve 33 in the fuel cell compartment 30. The fuel gas discharge pipe 71 extends from the inside of the lower duct compartment 70 to the inside of the upper duct compartment 80 via the lower duct compartment communication port 70*f* and the duct communication portion 91, and further communicates with the inside of the vent pipe 10. Therefore, the "part of the fuel gas discharge pipe 71" housed in the lower duct compartment 70 refers to a portion of the fuel gas discharge pipe 71 located between the point of the branching from the fuel gas supply pipe 32 and the upper duct compartment 80.

The lower duct compartment 70 further houses the release valve 72. The release valve 72 is an on-off valve installed in the fuel gas discharge pipe 71 to open or close the flow path of the fuel gas discharge pipe 71. The release valve 72 is an example of peripheral equipment 11. The opening and closing of the release valve 72 are controlled by the control unit 12*a*. The release valve 72 may be installed in the upper duct compartment 80.

The lower duct compartment 70 further houses a lower duct compartment internal gas detector 73. The lower duct compartment internal gas detector 73 is a fuel gas detector arranged inside the lower duct compartment 70. For example, if the fuel gas is hydrogen gas, the lower duct compartment internal gas detector 73 includes a hydrogen gas detection sensor.

The lower duct compartment internal gas detector 73 is arranged on the top wall 70*a* located at an upper portion of the lower duct compartment 70 to be close to the lower duct compartment communication port 70*f* or inside the lower duct compartment communication port 70*f*. In the unlikely event that the fuel gas leaks from the fuel gas supply pipe 32 in the lower duct compartment 70, the leaked fuel gas goes toward the upper duct compartment 80 through the lower duct compartment communication port 70*f*. That is, the lower duct compartment communication port 70*f* is located on the most downstream side of the flow path through which the fuel gas flows when the fuel gas leaks in the lower duct compartment 70. Therefore, by arranging the lower duct compartment internal gas detector 73 at a position close to the lower duct compartment communication port 70*f* or inside the lower duct compartment communication port 70*f*, a fuel gas leaked in the lower duct compartment 70 can be reliably detected by the lower duct compartment internal gas detector 73 located on the most downstream side of the flow path, regardless of where the fuel gas leaks.

If the lower duct compartment internal gas detector 73 detects the fuel gas in the lower duct compartment 70, a detection signal is sent from the lower duct compartment internal gas detector 73 to the control unit 12*a*. As a result, the control unit 12*a* can control the shutoff valves SV provided in the fuel gas supply pipe 32 to stop the supply of fuel gas from the fuel tank 41 to the fuel cell 31.

The lower duct compartment 70 may further house a fire detector that detects a fire inside the lower duct compartment 70.

The lower duct compartment air supply pipe 74 is connected to the lower duct compartment 70. The lower duct compartment air supply pipe 74 extends from the lower duct compartment air supply port 70*e* of the lower duct compartment 70 to the deck 1*a* and is exposed from the upper surface of the deck 1*a*.

A lower duct compartment air supply device 75 and a lower duct compartment external gas detector 76 are arranged at an end portion on the deck 1*a* side of the lower duct compartment air supply pipe 74. The lower duct compartment air supply device 75 and the lower duct compartment external gas detector 76 are located above the deck 1*a*.

The lower duct compartment air supply device 75 includes, for example, an inexpensive non-explosion-proof air supply fan, but may include an explosion-proof air supply fan. The drive of the lower duct compartment air supply device 75 is controlled by the control unit 12*a*. One or more filters (not illustrated) may be arranged in the lower duct compartment air supply device 75. The filter removes, for example, dust or sea salt particles.

The lower duct compartment air supply device 75 supplies the air outside the lower duct compartment 70 (duct compartment 90) to the inside of the lower duct compartment 70 via the lower duct compartment air supply pipe 74 and the lower duct compartment air supply port 70*e*. The air inside the lower duct compartment 70 is discharged to the upper duct compartment 80 through the lower duct compartment communication port 70*f*. In this way, the inside of the lower duct compartment 70 is ventilated. As a result, even if the fuel gas leaks from the fuel gas supply pipe 32 in the lower duct compartment 70, retention of the fuel gas can be suppressed.

The lower duct compartment external gas detector 76 detects combustible gas (for example, hydrogen gas floating around the hull 1) flowing into the duct compartment 90 from the outside. The lower duct compartment external gas detector 76 is, for example, a combustible gas sensor such as a hydrogen gas sensor. The lower duct compartment external gas detector 76 is arranged on a side opposite to the lower duct compartment air supply pipe 74 with respect to the lower duct compartment air supply device 75, that is, on the upstream side of the air flow from the outside to the inside of the duct compartment 90. The lower duct compartment external gas detector 76 may include a gas sensor that detects a combustible gas other than hydrogen gas.

The lower duct compartment external gas detector 76 outputs, for example, a detection signal indicating the concentration of combustible gas to the control unit 12*a*. As a result, the control unit 12*a* can determine, based on the detection signal, whether the concentration of the combustible gas is equal to or higher than a standard value. Then, if the concentration is equal to or higher than the standard value, the control unit 12*a* can control the shutoff valves SV to stop the supply of fuel gas from the fuel tank 41 to the fuel cell 31. The above-mentioned standard value may be determined based on experiments and/or experience.

<7-3-2. Upper Duct Compartment>

The upper duct compartment 80 is located on the deck 1*a*. More specifically, the upper duct compartment 80 is arranged on the deck 1*a* to cover an area partially including the lower duct compartment 70 and the tank compartment 40. The upper duct compartment 80 houses a part of the fuel gas discharge pipe 71 and a part of the gas filling pipe 42.

Here, the "part of the fuel gas discharge pipe 71" housed in the upper duct compartment 80 refers to a portion of the fuel gas discharge pipe 71 that extends from the lower duct compartment 70 toward the vent pipe 10. The "part of the gas filling pipe 42" housed in the upper duct compartment 80 refers to a portion of the gas filling pipe 42 that extends from the lower duct compartment 70 to the fuel gas filling port 82 described later.

The material of the upper duct compartment 80 is, for example, FRP, but may be an iron plate. The upper duct compartment 80 has a hollow shape. For example, the upper duct compartment 80 has a hollow and substantially rectangular parallelepiped shape. In this case, the outer walls of the upper duct compartment 80 include, for example, a top wall 80*a*, a bottom wall 80*b*, a front wall (not illustrated), a back wall (not illustrated), a side wall 80*c*, and a side wall 80*d*. However, the top surface, bottom surface, front surface, back surface, and side surfaces of the upper duct compartment 80 can be arbitrarily determined. The shape of the upper duct compartment 80 is not particularly limited as long as the upper duct compartment 80 has a space that can house a part of the fuel gas discharge pipe 71 and the like. The upper duct compartment 80 can also be regarded as a container, a chamber, or a box for housing the part of the fuel gas discharge pipe 71 and the like.

The fuel gas discharge pipe 71, as described above, communicates with the inside of the vent pipe 10. Thus, when the release valve 72 is opened, the gas inside the fuel gas discharge pipe 71 (for example, the fuel gas) flows from an end portion 71*a* of the fuel gas discharge pipe 71 into the vent pipe 10 and is released from the vent pipe 10 to outside the ship. Here, it is desirable that, in the vent pipe 10, the end portion 71*a* of the fuel gas discharge pipe 71 faces upward, that is, faces the open port side of the vent pipe 10. In this case, the discharge direction of gas discharged from the end portion 71*a* of the fuel gas discharge pipe 71 is upward.

For example, if the fuel gas is discharged sideways from the end portion 71*a* of the fuel gas discharge pipe 71, the discharged fuel gas reaches the inner wall surface of the vent pipe 10 and then flows downward. This may result in unwanted detection by the tank compartment internal gas detector 44*a* in the tank compartment 40. By the end portion 71*a* of the fuel gas discharge pipe 71 facing upward inside the vent pipe 10 as described above, it is possible to reduce unwanted detection by the tank compartment internal gas detector 44*a* due to the fuel gas discharged from the end portion 71*a*.

An upper duct compartment air supply port 80*e* with an opening is provided in the bottom wall 80*b* of the upper duct compartment 80. The upper duct compartment air supply port 80*e* communicates with the duct communication portion 91. Therefore, the upper duct compartment 80 communicates with the lower duct compartment 70 via the upper duct compartment air supply port 80*e*, the duct communication portion 91, and the lower duct compartment communication port 70*f*. The upper duct compartment air supply port 80*e* may be provided on an outer wall other than the bottom wall 80*b* in the upper duct compartment 80.

The upper duct compartment 80 has a vent pipe communication portion 81. The vent pipe communication portion 81 is a pipe by which the inside of the upper duct compartment 80 communicates with the vent pipe 10. In FIG. 11, the vent pipe communication portion 81 is illustrated as having a shape bent upward from the horizontal orientation, but the shape of the vent pipe communication portion 81 is not limited to the shape in FIG. 11. The reason why the vent pipe communication portion 81 is bent upward is similar to the reason why the end portion 71*a* of the fuel gas discharge pipe 71 is bent upward. That is, the vent pipe communication portion 81 is bent upward to reduce unwanted detection by the tank compartment internal gas detector 44*a* due to the fuel gas discharged from the vent pipe communication portion 81, which will be described later.

The vent pipe 10 extends upward from the tank compartment 40 and passes through the interior of the upper duct compartment 80. More specifically, the vent pipe 10 passes through the bottom wall 80*b* of the upper duct compartment 80, enters the inside of the vent pipe 10, and passes through the top wall 80*a*. The vent pipe communication portion 81 is provided in the upper duct compartment 80 to penetrate through the side wall of the vent pipe 10. As a result, the upper duct compartment 80 communicates with the vent pipe 10 via the vent pipe communication portion 81.

Therefore, the air inside the upper duct compartment 80 is discharged to the outside of the ship through the vent pipe communication portion 81 and the vent pipe 10. In this way, it is possible to ventilate the inside of the upper duct compartment 80. If the fuel gas leaks from the fuel gas discharge pipe 71 in the upper duct compartment 80, the leaked fuel gas is discharged to the outside of the ship through the vent pipe communication portion 81 and the vent pipe 10. In this way, it is possible to prevent the leaked fuel gas from being retained in the upper duct compartment 80.

The upper duct compartment 80 and the lower duct compartment 70 communicate with each other via the duct communication portion 91. As a result, (1) air taken into the inside of the lower duct compartment 70 via the lower duct compartment air supply pipe 74, (2) a fuel gas leaked from the fuel gas supply pipe 32 in the lower duct compartment 70 for some reason, and (3) air or a fuel gas discharged from the fuel cell compartment 30 to the lower duct compartment 70 via the communication pipe 92 can be discharged to the outside of the ship via the upper duct compartment 80 and the vent pipe 10. In this way, it is possible to suppress the retention of the fuel gas inside the lower duct compartment 70 and inside the fuel cell compartment 30.

The fuel gas filling port 82 and a fuel gas check valve 83 are provided in the upper duct compartment 80. The fuel gas filling port 82 is connected to the gas filling pipe 42. The fuel gas check valve 83 is provided in the gas filling pipe 42. More specifically, the fuel gas check valve 83 is located between the point where an inert gas pipe 87 (described later) branches from the gas filling pipe 42 and the fuel gas filling port 82.

The fuel gas supplied from the fuel gas filling port 82 travels through the fuel gas check valve 83 and the gas filling pipe 42, and is supplied to the fuel tank 41 in the tank compartment 40. As a result, the fuel gas is filled in the fuel tank 41 and stored. The fuel gas check valve 83 is provided to prevent backflow of the fuel gas from the fuel tank 41 side to the fuel gas filling port 82.

The upper duct compartment 80 is further provided with the inert gas filling port 84, an on-off valve 85, an inert gas check valve 86, and the inert gas pipe 87. The inert gas filling port 84 is connected to the inert gas pipe 87. The inert gas pipe 87 is provided by branching from the gas filling pipe 42 in the upper duct compartment 80. The on-off valve 85 and the inert gas check valve 86 are provided in the inert gas pipe 87. In the inert gas pipe 87, the on-off valve 85 is located between the inert gas filling port 84 and the inert gas check valve 86.

The on-off valve 85 opens or closes the flow path of the inert gas pipe 87. In a configuration in which the inert gas check valve 86 is provided in the inert gas pipe 87, installation of the on-off valve 85 may be omitted.

When inert gas is supplied to the inert gas filling port 84 and the on-off valve 85 opens the flow path of the inert gas pipe 87 in a state in which the fuel gas is not supplied to the fuel gas filling port 82, the inert gas is supplied to the fuel tank 41 in the tank compartment 40 through the inert gas check valve 86, and via the inert gas pipe 87 and the gas filling pipe 42. In addition, the tank side shutoff valve 43 opens the flow path of the fuel gas supply pipe 32, the fuel cell side shutoff valve 33 closes the flow path of the fuel gas supply pipe 32, and the release valve 72 opens the flow path of the fuel gas discharge pipe 71, whereby the fuel gas remaining in the fuel tank 41 is discharged to the vent pipe 10 via the fuel gas supply pipe 32 and the fuel gas discharge pipe 71. As a result, the fuel gas can be removed from the fuel tank 41 (purge process).

There may be a pipe from the gas filling pipe 42 that is directly connected to the fuel gas supply pipe 32 between the fuel tank 41 and the tank side shutoff valve 43 (tank method). In this configuration, when performing a purge process for the fuel tank 41 using the inert gas, it is necessary to fill the fuel tank 41 with the inert gas in a state in which the tank side shutoff valve 43 is closed, and after that, to open the tank side shutoff valve 43 for the purpose of facilitating the release of the inert gas from the fuel tank 41.

The fuel gas filling port 82 and the inert gas filling port 84 are provided in the upper duct compartment 80 as described above. More specifically, the fuel gas filling port 82 and the inert gas filling port 84 are located at a boundary surface between the inside and the outside of the upper duct compartment 80. That is, "the fuel gas filling port 82 and the inert gas filling port 84 are provided in the upper duct compartment 80" includes a case where the fuel gas filling port 82 and the inert gas filling port 84 are provided at the boundary surface of the upper duct compartment 80.

An upper duct compartment internal gas detector 88 is housed in the upper duct compartment 80. The upper duct compartment internal gas detector 88 is a fuel gas detector arranged inside the upper duct compartment 80. For example, if the fuel gas is hydrogen gas, the upper duct compartment internal gas detector 88 includes a hydrogen gas detection sensor.

The upper duct compartment internal gas detector 88 is arranged on the top wall 80*a* located in an upper portion of the upper duct compartment 80. Hydrogen gas as the fuel gas is lighter than air and rises. Therefore, if the fuel gas leaks in the upper duct compartment 80, the leaked fuel gas can be reliably detected by the upper duct compartment internal gas detector 88. To more reliably detect the fuel gas leaked in the upper duct compartment 80, the upper duct compartment internal gas detector 88 may be arranged at a position close to the vent pipe communication portion 81.

If the upper duct compartment internal gas detector 88 detects the fuel gas in the upper duct compartment 80, a detection signal is sent from the upper duct compartment internal gas detector 88 to the control unit 12*a*. As a result, the control unit 12*a* can control the shutoff valves SV provided in the fuel gas supply pipe 32 to stop the supply of fuel gas from the fuel tank 41 to the fuel cell 31.

The upper duct compartment 80 may further house a fire detector that detects a fire inside the upper duct compartment 80.

(7-4. Supplementary Information about Vent Pipe)

Inside the vent pipe 10, a vent pipe internal gas detector 10*a* is provided further on the downstream side than a discharge port 81*a* of the vent pipe communication portion 81. The downstream side refers to the downstream side in the air flow direction when the air inside the tank compartment 40 flows inside the vent pipe 10 and is discharged to the outside of the ship. For example, if the fuel gas is hydrogen gas, the vent pipe internal gas detector 10*a* includes a diffusion type or suction type hydrogen gas detection sensor. A detection signal from the vent pipe internal gas detector 10*a* is sent to the control unit 12*a*.

For example, in a state where the control unit 12*a* outputs a signal (closing signal) for closing the release valve 72, if the vent pipe internal gas detector 10*a* detects the fuel gas even though the tank compartment internal gas detector 44*a* and the upper duct compartment internal gas detector 88 do not detect the fuel gas, it is possible to determine that the release valve 72 is not completely blocking the flow path of the fuel gas discharge pipe 71, that is, the release valve 72 is malfunctioning. In this case, by sending a notification to the outside, for example, the control unit 12*a* can prompt a maintenance person to inspect, repair, or replace the release valve 72. The notification to the outside includes a monitor display, output of an alarm sound, transmission of information to an external terminal, and the like.

[8. Power Generation Control of Fuel Cell Based on Anomaly Detection]

As described above, the fuel cell ship SH of the present embodiment includes the plurality of fuel cells 31, and also includes the plurality of fuel cell compartments 30 for housing the fuel cells 31. Therefore, a plurality of cell compartment air supply devices 36 for supplying air in the fuel cell compartments 30 are also provided corresponding to each fuel cell compartment 30. Accordingly, it can be said that the fuel cell ship SH of the present embodiment has the following configuration. That is, the fuel cell ship SH includes the plurality of fuel cell compartments 30 each including one of the plurality of fuel cells 31 separately installed, and the plurality of cell compartment air supply devices 36 each supplying air to the inside of one of the plurality of fuel cell compartments 30.

The above-described control unit 12a of the present embodiment also functions as an electric power generation control unit that controls the electric power generation of the plurality of fuel cells 31. Particularly, if at least one of the plurality of cell compartment air supply devices 36 stops, the control unit 12a stops the electric power generation of the fuel cell 31 installed in the fuel cell compartment 30 to which the cell compartment air supply device 36 that has stopped supplied air.

Determining whether the cell compartment air supply device 36 has stopped can be performed by the control unit 12a constantly or periodically monitoring signal output by the cell compartment air supply devices 36 during operation. For example, if the above-mentioned signal is not received even though the fuel cell 31 is operating (generating electric power), the control unit 12a can determine that the cell compartment air supply device 36 has stopped due to a failure or the like. That is, the control unit 12a can determine whether the cell compartment air supply device 36 has stopped based on the above-mentioned signal output by the cell compartment air supply devices 36 during operation.

In this control, if the cell compartment air supply device 36 has stopped for some reason (for example, a failure), ventilation of the fuel cell compartment 30 to which the cell compartment air supply device 36 that has stopped supplied air cannot be performed, and thus it becomes impossible to deal with fuel gas leak in the fuel cell compartment 30. Therefore, if the cell compartment air supply device 36 has stopped, the control unit 12a as the electric power generation control unit stops the electric power generation of the fuel cell 31 in the fuel cell compartment 30 to which air was supplied by the cell compartment air supply device 36 that has stopped. As a result, the risk of fuel gas leakage in the fuel cell compartment 30 due to the operation of the fuel cell 31 can be reduced even a little, and efforts can be made to ensure safety.

As described above, the fuel cell ship SH of the present embodiment includes at least one tank compartment 40 in which the fuel tank 41 for housing the fuel gas is installed, and the tank compartment air supply device 46 that supplies air to the inside of the tank compartment 40. In this configuration, if the tank compartment air supply device 46 stops, the control unit 12a stops electric power generation of a fuel cell 31 of the plurality of fuel cells 31, to which the fuel gas is supplied from the fuel tank 41 installed in the tank compartment 40 to which the tank compartment air supply device 46 that has stopped supplied air.

For example, in the configuration illustrated in FIG. 2, if the tank compartment air supply device 46 that supplies air into the tank compartment 40 housing the fuel tank 41a has stopped due to a failure, the control unit 12a as the electric power generation control unit stops the electric power generation of the fuel cells 31a and 31b to which the fuel gas is supplied from the fuel tank 41a.

The power consumption of the tank compartment air supply device 46 can be monitored or signal output during operation can be constantly or periodically monitored by the control unit 12a to determine whether the tank compartment air supply device 46 has stopped. For example, if the above-mentioned signal is not received even though the fuel cell 31 is operating (generating electric power), the control unit 12a can determine that the tank compartment air supply device 46 has stopped due to a failure or the like. That is, the control unit 12a can determine whether the tank compartment air supply device 46 has stopped based on the above-mentioned signal output by the tank compartment air supply device 46 during operation.

If the tank compartment air supply device 46 has stopped for some reason (for example, a failure), ventilation of the inside of the tank compartment 40 to which the tank compartment air supply device 46 that has stopped supplied air cannot be performed. In this case, it becomes impossible to deal with fuel gas leakage in the tank compartment 40. Therefore, if the tank compartment air supply device 46 stops, the control unit 12a stops electric power generation of a fuel cell 31 of the plurality of fuel cells 31, to which the fuel gas is supplied from the fuel tank 41 in the tank compartment 40 to which the tank compartment air supply device 46 that has stopped supplied air. As a result, the possibility of fuel gas leaking in the tank compartment 40 due to the supply of the fuel gas to the fuel cell 31 can be reduced even a little, and efforts can be made to ensure safety.

As described above, the fuel cell ship SH of the present embodiment includes the plurality of fuel cell compartments 30. Therefore, the plurality of cell compartment internal gas detectors 34a and cell compartment external gas detectors 37 are also provided corresponding to each fuel cell compartment 30. That is, the fuel cell ship SH includes the plurality of fuel cell compartments 30 each including one of the plurality of fuel cells 31 separately installed, the plurality of cell compartment internal gas detectors 34a that are respectively arranged inside the plurality of fuel cell compartments 30 and that detect the fuel gas, and the plurality of cell compartment external gas detectors 37 that are respectively arranged outside the plurality of fuel cell compartments 30 and that detect the fuel gas flowing into the fuel cell compartments 30.

If at least one of the plurality of cell compartment internal gas detectors 34a and the plurality of cell compartment external gas detectors 37 reacts to the fuel gas or the combustible gas or fails, the control unit 12a as the electric power generation control unit of the present embodiment stops electric power generation of a fuel cell 31 of the plurality of fuel cells 31, in the fuel cell compartment 30 in which the cell compartment internal gas detector 34a or the cell compartment external gas detector 37 that has reacted or failed is arranged.

Determining whether the cell compartment internal gas detector 34a or the cell compartment external gas detector 37 has failed can be performed by the control unit 12a constantly or periodically monitoring signals output from the cell compartment internal gas detectors 34a and the cell compartment external gas detectors 37 during operation (when normal). For example, if the above-mentioned signal is not received even though the fuel cell 31 is operating (generating electric power), the control unit 12a can determine that the cell compartment internal gas detector 34a or the cell compartment external gas detector 37 has failed (stopped). That is, the control unit 12a can determine, based on the above signals output by the cell compartment internal gas detectors 34a and the cell compartment external gas detectors 37 during operation, whether the cell compartment internal gas detector 34a or the cell compartment external gas detector 37 has failed (stopped).

If the cell compartment internal gas detector 34a detects the fuel gas (reacts to the fuel gas), there is a high possibility that a fuel gas leak has occurred in the fuel cell compartment 30. If the cell compartment external gas detector 37 detects combustible gas (reacts to combustible gas), there is a high possibility that combustible gas is flowing into the inside from the outside of the fuel cell compartment 30 and retained inside. In these cases, in terms of safety, driving the fuel cell 31 installed in that fuel cell compartment 30 is not preferable (there is a risk of explosion for some reason). If the cell compartment air supply device 36 is not explosion-proof, there is a risk that the cell compartment air supply device 36 will explode.

If the cell compartment internal gas detector 34a or the cell compartment external gas detector 37 fails, it is not possible to detect a fuel gas leak inside the fuel cell compartment 30 or inflow of combustible gas from the outside to the inside of the fuel cell compartment 30. Therefore, in terms of safety, driving the fuel cell 31 in this state is not preferable.

Stopping, when at least one of the plurality of cell compartment internal gas detectors 34a and the plurality of cell compartment external gas detectors 37 reacts or fails, electric power generation of a fuel cell 31 of the plurality of fuel cells 31, in the fuel cell compartment 30 in which the cell compartment internal gas detector 34a or the cell compartment external gas detector 37 that has reacted or failed is correspondingly arranged (inside or outside thereof), by the control unit 12a as the electric power generation control unit, makes it possible to ensure safety.

The fuel cell ship SH of this embodiment, as described above, includes at least one tank compartment 40 in which the fuel tank 41 for housing the fuel gas is installed, the tank compartment internal gas detector 44a which is arranged inside the tank compartment 40 and detects the fuel gas, and the tank compartment external gas detector 47 that is arranged outside the tank compartment 40 and detects combustible gas flowing into the inside of the tank compartment 40. In this configuration, if at least one of the tank compartment internal gas detector 44a and the tank compartment external gas detector 47 reacts to the fuel gas or the combustible gas or fails, the control unit 12a stops electric power generation of a fuel cell 31 of the plurality of fuel cells 31, to which the fuel gas is supplied from the fuel tank 41 in the tank compartment 40 in which the tank compartment internal gas detector 44a or the tank compartment external gas detector 47 that has reacted or failed is arranged.

For example, in the configuration illustrated in FIG. 2, if the tank compartment internal gas detector 44a or the tank compartment external gas detector 47 arranged corresponding to the tank compartment 40 housing the fuel tank 41c reacts to the fuel gas or combustible gas, the control unit 12a, as an electric power generation control unit, stops the electric power generation of the fuel cell 31c to which the fuel gas is supplied from the fuel tank 41c. In addition, for example, if the tank compartment internal gas detector 44a or the tank compartment external gas detector 47 arranged corresponding to the tank compartment 40 housing the fuel tank 41c fails, the control unit 12a also stops the electric power generation of the fuel cell 31c to which the fuel gas is supplied from the fuel tank 41c.

Determining whether the tank compartment internal gas detector 44a or the tank compartment external gas detector 47 has failed can be performed by monitoring the power consumption of the tank compartment internal gas detectors 44a and the tank compartment external gas detectors 47, or by the control unit 12a constantly or periodically monitoring signals output from the tank compartment internal gas detectors 44a and tank compartment external gas detectors 47 during operation (when normal). For example, if the above-mentioned signal is not received even though the fuel cell 31 is operating (generating electric power), the control unit 12a can determine that the tank compartment internal gas detector 44a or the tank compartment external gas detector 47 has failed (stopped). That is, the control unit 12a can determine, based on the above signals output by the tank compartment internal gas detectors 44a and the tank compartment external gas detectors 47 during operation, whether the tank compartment internal gas detector 44a or the tank compartment external gas detector 47 has failed (stopped).

If the tank compartment internal gas detector 44a detects the fuel gas (reacts to the fuel gas), there is a high possibility that a fuel gas leak has occurred in the tank compartment 40. If the tank compartment external gas detector 47 detects combustible gas (reacts to combustible gas), there is a high possibility that combustible gas is flowing into the inside from the outside of the tank compartment 40 and retained inside. In these cases, in terms of safety, driving the fuel cell 31 to which the fuel gas is supplied from the tank compartment 40 is not preferable (there is a risk of explosion for some reason). If the tank compartment air supply device 46 is not explosion-proof, there is a risk that the tank compartment air supply device 46 will explode.

If the tank compartment internal gas detector 44a or the tank compartment external gas detector 47 fails, it is not possible to detect a fuel gas leak inside the tank compartment 40 or inflow of combustible gas from the outside to the inside of the tank compartment 40. Therefore, in terms of safety, driving the fuel cell 31 in this state is not preferable.

Stopping, when at least one of the tank compartment internal gas detectors 44a and the tank compartment external gas detectors 47 reacts or fails, electric power generation of a fuel cell 31 of the plurality of fuel cells 31, to which the fuel gas is supplied from the fuel tank 41 in the tank compartment 40 in which the tank compartment internal gas detector 44a or the tank compartment external gas detector 47 that has reacted or failed is correspondingly arranged (inside or outside thereof), by the control unit 12a as the electric power generation control unit, makes it possible to ensure safety.

In the present embodiment, the duct compartments 90 forming a pair are provided on the starboard side and the port side of the fuel cell ship SH, respectively. In this configuration, if, in at least one of the duct compartments 90, at least one of the lower duct compartment internal gas detector 73, the upper duct compartment internal gas detector 88, and the lower duct compartment external gas detector 76 reacts to the fuel gas or combustible gas or fails, it is desirable that the control unit 12a stops electric power generation of a fuel cell 31, of the plurality of fuel cells 31, to which the fuel gas is supplied from the fuel tank 41 via the duct compartment 90 in which the lower duct compartment internal gas detector 73, the upper duct compartment internal gas detector 88, or the lower duct compartment external gas detector 76 which has reacted or failed is arranged.

If the lower duct compartment internal gas detector 73 or the upper duct compartment internal gas detector 88 detects the fuel gas (reacts to the fuel gas), it is highly possible that a fuel gas leak has occurred in the duct compartment 90. If the lower duct compartment external gas detector 76 detects combustible gas (reacts to combustible gas), there is a high possibility that combustible gas is flowing into the inside from the outside of the duct compartment 90 and retained inside. In these cases, in terms of safety, driving the fuel cell 31 to which the fuel gas is supplied from the tank compartment 40 through the duct compartment 90 is not preferable (there is a risk of explosion for some reason). If the lower duct compartment air supply device 75 is not explosion-proof, there is a risk that the lower duct compartment air supply device 75 will explode. The electric power generation of the fuel cell 31 selected as described above can be stopped to ensure safety.

[9. Limitation of Electric Power Input to Propulsion Device]

In the fuel cell ship SH equipped with the plurality of fuel cells 31, as described above, even in a case of an emergency shutdown of at least one of the fuel cells 31 due to fuel gas leakage or other event in the hull 1 during sailing, at least one of the electric power output from the other fuel cells 31 and the electric power supplied by the storage battery 51 can drive the propulsion device 6 to continue sailing.

Here, in a case where the electric power input from the fuel cell 31 to the propulsion device 6 is rapidly reduced due to an emergency shutdown of the fuel cell 31, if the electric power output from the storage battery 51 is low, the sailing speed of the fuel cell ship SH is rapidly reduced, making it easier for persons on the ship to fall over. This is because the fuel cell ship SH that sails at sea and in rivers, receives a large amount of resistance from the water surface during sailing, unlike vehicles traveling on a road.

Therefore, in the fuel cell ship SH equipped with the plurality of fuel cells 31, at least one storage battery 51, and the propulsion device 6, as in the present embodiment, the control unit 12a may monitor temperature information of the storage battery 51 and the state of charge (SOC) data, and based on the above temperature information and SOC data, calculate electric power that can be output from the storage battery 51, and set an upper limit value of the electric power as the upper limit value of the input power value (proportional to at least one of the rotational speed and the torque) supplied to the propulsion device 6.

For example, in the configuration illustrated in FIG. 2, as described above, if a fuel gas leak is detected in the tank compartment 40 housing the fuel tank 41b, the control unit 12a stops the electric power generation of the fuel cells 31a and 31b to which the fuel gas is supplied from the fuel tank 41b. In this case, it is necessary for the fuel cells 31c, 31d and 31e and the storage battery 51 to supply electric power for operating the propulsion device 6. If the fuel cells 31c, 31d and 31e are stopped for some reason, it is necessary to supply electric power for operating the propulsion device 6 with only the storage battery 51.

Therefore, during normal operation (normal sailing), it is desirable that the control unit 12a sets the upper limit value of the electric power value input to the propulsion device 6 (particularly the propulsion motor 6b) from at least one of the fuel cells 31 and the storage battery 51, as the output upper limit value of the storage battery 51. In this case, even if, for example, emergency shutdown of all of the fuel cells 31 occurs for some reason, the propulsion device 6 can continue to operate with the electric power output from the storage battery 51 without rapidly reducing the sailing speed of the fuel cell ship SH. That is, even if emergency shutdown of the fuel cells 31 occurs during sailing, it is possible to prevent a sudden decrease in sailing speed. As a result, it is possible to reduce the risk that persons on the ship fall over when emergency shutdown of the fuel cells 31 occurs.

[10. Other]

In the present embodiment, the fuel gas is used as the fuel supplied from the fuel tank 41 to the fuel cell 31, but the fuel is not limited to a gas and may be a liquid. When a liquid fuel is used, if the liquid fuel leaks from a pipe, the leaked liquid fuel vaporizes and becomes a gas (a fuel gas).

In the present embodiment, a configuration in which the fuel cell ship SH has the duct compartment 90 has been described, but the duct compartment 90 need not be installed. For example, by providing vent pipes corresponding to each of the tank compartment 40 and the fuel cell compartment 30, the installation of the duct compartment 90 can be omitted (this is because it is not necessary to provide a flow path from the fuel cell compartment 30 to the vent pipe 10).

Embodiments of the present invention have been described above; however, the scope of the present invention is not limited to these embodiments, and can be extended or modified without departing from the gist of the invention.

INDUSTRIAL APPLICABILITY

The present invention can be used, for example, in a fuel cell ship.

REFERENCE SIGNS LIST

1 Hull
6 Propulsion device
12a Control unit (degradation rate control unit, electric power generation control unit)
31 Fuel cell
41 Fuel tank
41a Individual tank (fuel tank)
41b Individual tank (fuel tank)
51 Storage battery
100 Electric power supply unit
SH Fuel cell ship

The invention claimed is:

1. A fuel cell ship, the fuel cell ship comprising:
a propulsion device configured to generate a propulsive force on a hull by electric power;
an electric power supply unit configured to supply the electric power to the propulsion device, wherein the electric power supply unit includes a plurality of fuel cells configured to generate electric power by an electrochemical reaction of fuel and at least one storage battery; and
a degradation rate control unit configured to:
adjust a degradation rate of the plurality of fuel cells when an electric power load consumed by the fuel cell ship is equal to or less than a first threshold value, wherein the first threshold value is determined according to:
a lower limit value of a range of electric power generation output of the plurality of fuel cells in which a degradation progress rate of the plurality of fuel cells is equal to or less than a predetermined value, and
a quantity of fuel cells of the plurality of the fuel cells; and
change a method of adjusting the degradation rate according to an estimated time during which a state continues where the electric power load is equal to or less than the first threshold value.

2. The fuel cell ship according to claim 1, comprising a plurality of sets of the propulsion device and the electric power supply unit.

3. The fuel cell ship according to claim 1, further comprising a plurality of fuel tanks configured to store the fuel, wherein the plurality of fuel tanks include a first fuel tank and a second fuel tank that are each connected to a same two or more fuel cells of the plurality of fuel cells.

4. The fuel cell ship according to claim 1, wherein the degradation rate indicates a degree of degradation of the plurality of fuel cells, the degradation rate control unit is configured to adjust the degradation rate of at least one fuel cell of the plurality of fuel cells so that an estimated replacement period approaches or coincides with a scheduled replacement period, the estimated replacement period is a period when the degradation rate of each fuel cell of the plurality of fuel cells reaches a degradation rate suitable for replacement due to degradation of each of the plurality of fuel cells, and the scheduled replacement period is a predetermined replacement period of each of the plurality of fuel cells.

5. The fuel cell ship according to claim 1, wherein if the electric power load consumed by the fuel cell ship is equal to or greater than a second threshold value determined according to a rated output of a respective fuel cell of the plurality of fuel cells and a quantity of fuel cells of the plurality of the fuel cells, the degradation rate control unit is configured to:

adjust the degradation rate of the plurality of fuel cells, and set, to a value equal to or less than the rated output, the electric power generation output of a fuel cell of the plurality of the fuel cells whose degradation is to be suppressed.

6. The fuel cell ship according to claim 1, further comprising:

a plurality of fuel cell compartments each including one of the plurality of fuel cells separately installed;

a plurality of cell compartment air supply devices each configured to supply air to inside of one of the plurality of fuel cell compartments; and an electric power generation control unit configured to control electric power generation of the plurality of fuel cells, wherein, if at least one of the plurality of cell compartment air supply devices stops, the electric power generation control unit is configured to stop electric power generation of the fuel cell installed in the fuel cell compartment to which the cell compartment air supply device that has stopped supplied air.

7. The fuel cell ship according to claim 6, further comprising:

at least one tank compartment installed with a fuel tank configured to store the fuel; and a tank compartment air supply device configured to supply air to an inside of the at least one tank compartment, wherein if the tank compartment air supply device stops, the electric power generation control unit is configured to stop electric power generation of a fuel cell of the plurality of fuel cells to which the fuel is supplied from the fuel tank installed in the at least one tank compartment to which the tank compartment air supply device that has stopped supplied air.

8. The fuel cell ship according to claim 1, further comprising:

a plurality of fuel cell compartments each including one of the plurality of fuel cells separately installed;

a plurality of cell compartment internal gas detectors, each of which is arranged inside a respective one of the plurality of fuel cell compartments and is configured to detect a fuel gas that is the fuel in a gaseous state;

a plurality of cell compartment external gas detectors, each of which is arranged outside a respective one of the plurality of fuel cell compartments and is configured to detect a combustible gas flowing into the respective one of the plurality of fuel cell compartments; and an electric power generation control unit configured to control electric power generation of the plurality of fuel cells, wherein, if at least one of the plurality of cell compartment internal gas detectors or the plurality of cell compartment external gas detectors reacts to the fuel gas or the combustible gas or fails, the electric power generation control unit is configured to stop electric power generation of a fuel cell of the plurality of fuel cells that is in the fuel cell compartment in which the at least one of the plurality of cell compartment internal gas detectors or the plurality of cell compartment external gas detectors that has reacted or failed is arranged.

9. The fuel cell ship according to claim 8, further comprising:

at least one tank compartment installed with a fuel tank configured to store the fuel;

a tank compartment internal gas detector that is arranged inside the tank compartment and configured to detect a fuel gas being the fuel in a gaseous state; and a tank compartment external gas detector that is arranged outside the tank compartment and configured to detect combustible gas flowing into the tank compartment, wherein, if at least one of the tank compartment internal gas detector and the tank compartment external gas detector reacts to the fuel gas or the combustible gas or fails, the electric power generation control unit is configured to stop electric power generation of a fuel cell of the plurality of fuel cells, to which the fuel is supplied from the fuel tank in the tank compartment in which the tank compartment internal gas detector or the tank compartment external gas detector that has reacted or failed is arranged.

10. A fuel cell ship, the fuel cell ship comprising:

a propulsion device configured to generate a propulsive force on a hull by electric power;

an electric power supply unit configured to supply the electric power to the propulsion device, wherein the electric power supply unit includes a plurality of fuel cells configured to generate electric power by an electrochemical reaction of fuel and at least one storage battery;

a plurality of fuel cell compartments each including one fuel cell of the plurality of fuel cells separately installed;

a plurality of cell compartment air supply devices each configured to supply air to an inside of one of the plurality of fuel cell compartments; and an electric power generation control unit configured to control electric power generation of the plurality of fuel cells, wherein, if at least one of the plurality of cell compartment air supply devices stops, the electric power generation control unit is configured to stop electric power generation of the respective fuel cell installed in the fuel cell compartment to which the cell compartment air supply device that has stopped was supplying air.

11. A fuel cell ship, the fuel cell ship comprising:

a propulsion device configured to generate a propulsive force on a hull by electric power;

an electric power supply unit configured to supply the electric power to the propulsion device, wherein the electric power supply unit includes a plurality of fuel cells configured to generate electric power by an electrochemical reaction of fuel and at least one storage battery;

a plurality of fuel cell compartments each including one fuel cell of the plurality of fuel cells separately installed;

a plurality of cell compartment internal gas detectors, each of which is arranged inside a respective one of the plurality of fuel cell compartments and is configured to detect a fuel gas, wherein the fuel gas is the fuel in a gaseous state;

a plurality of cell compartment external gas detectors, each of which is arranged outside a respective one of the plurality of fuel cell compartments and is configured to detect a combustible gas flowing into the respective one of the plurality of fuel cell compartments; and an electric power generation control unit configured to control electric power generation of the plurality of fuel cells, wherein, if at least one of the plurality of cell compartment internal gas detectors or the plurality of cell compartment external gas detectors reacts to the fuel gas or the combustible gas or fails, the electric power generation control unit is configured to stop electric power generation of a respective fuel cell of the plurality of fuel cells that is in the fuel cell compartment in which the at least one of the plurality of cell compartment internal gas detectors or the plurality of cell compartment external gas detectors that has reacted or failed is arranged.

* * * * *